(12) United States Patent
Yu

(10) Patent No.: US 10,390,080 B2
(45) Date of Patent: Aug. 20, 2019

(54) USER INTERFACE BASED ON DEVICE-STATE INFORMATION

(71) Applicant: EVA Automation, Inc., Redwood City, CA (US)

(72) Inventor: Gaylord Yu, San Francisco, CA (US)

(73) Assignee: Eva Automation, Inc., Menlo Park, CA (US)

( * ) Notice: Subject to any disclaimer, the term of this patent is extended or adjusted under 35 U.S.C. 154(b) by 380 days.

(21) Appl. No.: 15/250,927

(22) Filed: Aug. 30, 2016

(65) Prior Publication Data

US 2017/0060510 A1    Mar. 2, 2017

Related U.S. Application Data

(60) Provisional application No. 62/211,827, filed on Aug. 30, 2015.

(51) Int. Cl.
*G06F 3/14* (2006.01)
*H04N 21/4363* (2011.01)
(Continued)

(52) U.S. Cl.
CPC ..... *H04N 21/43635* (2013.01); *G06F 1/1643* (2013.01); *G06F 3/016* (2013.01);
(Continued)

(58) Field of Classification Search
CPC .. G06F 3/04812; G06F 3/0488; G06F 3/0484; G06F 3/0482; G06F 17/00; G06F 3/1423; H04N 5/232

See application file for complete search history.

(56) References Cited

U.S. PATENT DOCUMENTS 8,026,789 B2    9/2011 Harris ............................ 340/3.2
8,531,276 B2    9/2013 Harris ........................ 340/12.22
(Continued)

FOREIGN PATENT DOCUMENTS

CN    202057345 U  * 11/2011

OTHER PUBLICATIONS

International Search Report and Written Opinion for PCT/US2016/049524, dated Jan. 1, 2017.
(Continued)

*Primary Examiner* — Steven P Sax
(74) *Attorney, Agent, or Firm* — Steven Stupp

(57) ABSTRACT

A portable electronic device with a touch-sensitive display (such as a cellular telephone) provides a wireless remote control for an entertainment device (such as a consumer-electronic device). Based on device-state information that specifies a current state of the entertainment device (which is received from an audio/video (A/V) hub that communicates with the entertainment device) and one or more related states of the entertainment device, the portable electronic device may generate a user interface that includes one or more virtual command icons. Note that the one or more related states are related to the current state in a state diagram by corresponding operations that transition the entertainment device from the current state to the one or more related states. Then, the portable electronic displays the user interface on the touch-sensitive display. In this way, the portable electronic device dynamically adapts the user interface.

20 Claims, 21 Drawing Sheets

(51) Int. Cl.

| | |
|---|---|
| *G06F 3/0481* | (2013.01) |
| *H04N 21/414* | (2011.01) |
| *H04N 21/422* | (2011.01) |
| *H04N 21/431* | (2011.01) |
| *H04N 21/435* | (2011.01) |
| *H04N 21/482* | (2011.01) |
| *G06F 3/0482* | (2013.01) |
| *H04N 21/442* | (2011.01) |
| *G06F 3/0484* | (2013.01) |
| *G06F 3/0488* | (2013.01) |
| *G06F 3/01* | (2006.01) |
| *G08C 17/02* | (2006.01) |
| *H04M 1/725* | (2006.01) |
| *H04N 5/44* | (2011.01) |
| *G06F 3/041* | (2006.01) |
| *H04N 21/41* | (2011.01) |
| *H04N 21/436* | (2011.01) |
| *H04N 21/472* | (2011.01) |
| *G06F 1/16* | (2006.01) |
| *H04N 5/445* | (2011.01) |
| *H04N 7/015* | (2006.01) |
| *H04N 21/443* | (2011.01) |

(52) U.S. Cl.
CPC .......... *G06F 3/0416* (2013.01); *G06F 3/0482* (2013.01); *G06F 3/0484* (2013.01); *G06F 3/04817* (2013.01); *G06F 3/04847* (2013.01); *G06F 3/04883* (2013.01); *G06F 3/04886* (2013.01); *G06F 3/14* (2013.01); *G08C 17/02* (2013.01); *H04M 1/72533* (2013.01); *H04N 5/4403* (2013.01); *H04N 5/44543* (2013.01); *H04N 7/015* (2013.01); *H04N 21/4126* (2013.01); *H04N 21/41407* (2013.01); *H04N 21/42204* (2013.01); *H04N 21/435* (2013.01); *H04N 21/4312* (2013.01); *H04N 21/43615* (2013.01); *H04N 21/43637* (2013.01); *H04N 21/443* (2013.01); *H04N 21/44204* (2013.01); *H04N 21/47217* (2013.01); *H04N 21/482* (2013.01); *G08C 2201/21* (2013.01); *G08C 2201/30* (2013.01); *G08C 2201/93* (2013.01); *G09G 2370/06* (2013.01); *H04M 2250/22* (2013.01); *H04N 2005/443* (2013.01); *H04N 2005/4408* (2013.01); *H04N 2005/4425* (2013.01)

(56) References Cited

U.S. PATENT DOCUMENTS

| | | | | |
|---|---|---|---|---|
| 8,537,516 | B1* | 9/2013 | Chelcun | H02J 3/00 361/42 |
| 8,674,814 | B2 | 3/2014 | Harris | 340/12.22 |
| 8,766,783 | B1 | 7/2014 | Hughes | 340/12.3 |
| 8,797,149 | B2 | 8/2014 | Harris | 340/12.22 |
| 9,239,837 | B2 | 1/2016 | Chardon et al. | G06F 17/30011 |
| 9,456,149 | B2 | 9/2016 | Roberts | H04N 5/268 |
| 9,467,848 | B1* | 10/2016 | Song | G06F 3/0488 |
| 2004/0017388 | A1* | 1/2004 | Stautner | H04N 5/44543 348/E5.105 |
| 2004/0111332 | A1* | 6/2004 | Baar | G06F 3/0481 705/50 |
| 2005/0001905 | A1* | 1/2005 | Shinonniya | H04N 5/2251 348/207.99 |
| 2007/0157089 | A1* | 7/2007 | Van Os | G06F 3/04817 715/702 |
| 2008/0074309 | A1* | 3/2008 | Nilsson | G01F 23/284 342/124 |
| 2008/0163086 | A1* | 7/2008 | Foxenland | G06F 3/0481 715/764 |
| 2008/0215240 | A1* | 9/2008 | Howard | G01C 21/36 701/469 |
| 2009/0108848 | A1 | 4/2009 | Lundquist et al. | 324/538 |
| 2009/0156051 | A1 | 6/2009 | Doyle et al. | 439/489 |
| 2009/0273496 | A1* | 11/2009 | Renner | H03M 1/0827 341/119 |
| 2010/0066919 | A1 | 3/2010 | Nakajima et al. | 348/734 |
| 2010/0118188 | A1 | 5/2010 | Nakajima et al. | 348/467 |
| 2010/0135429 | A1 | 6/2010 | Nakajima et al. | 375/295 |
| 2010/0185989 | A1 | 7/2010 | Shiplacoff et al. | 715/856 |
| 2011/0090400 | A1 | 4/2011 | Huang | 348/554 |
| 2011/0211131 | A1 | 9/2011 | Kikuchi et al. | 348/734 |
| 2013/0002289 | A1 | 1/2013 | Toba | 326/21 |
| 2013/0017870 | A1* | 1/2013 | Parker | G06Q 30/02 463/1 |
| 2013/0107131 | A1 | 5/2013 | Barnett | 348/734 |
| 2013/0144487 | A1 | 6/2013 | Suzuki | G06F 17/00 |
| 2014/0114889 | A1* | 4/2014 | Dagum | G06F 19/3418 706/12 |
| 2014/0273569 | A1* | 9/2014 | Jakobson | G01R 1/06738 439/169 |
| 2015/0112899 | A1* | 4/2015 | Dagum | A61B 5/6898 706/12 |
| 2015/0178348 | A1* | 6/2015 | Rohde | G06F 17/30377 707/734 |
| 2015/0350403 | A1* | 12/2015 | Eim | G06F 1/163 455/420 |
| 2015/0382066 | A1 | 12/2015 | Heeter et al. | H04N 21/47217 |
| 2016/0025784 | A1* | 1/2016 | Ripp | G01R 1/04 324/555 |
| 2018/0032997 | A1* | 2/2018 | Gordon | G06Q 20/3224 |

OTHER PUBLICATIONS

Office Action, U.S. Appl. No. 15/250,928, dated May 17, 2017.
Response to Office Action, U.S. Appl. No. 15/250,928, dated Jun. 5, 2017.
https://en.wikipedia.org/wiki/Ground_loop_(electricity), Jan. 25, 2009.
Office Action, U.S. Appl. No. 15/250,928, dated Aug. 1, 2017.
Response to Office Action, U.S. Appl. No. 15/250,928, dated Sep. 5, 2017.
Office Action, U.S. Appl. No. 15/607,621, dated Aug. 14, 2017.
Response to Office Action, U.S. Appl. No. 15/607,621, dated Sep. 8, 2017.
Office Action, U.S. Appl. No. 15/607,626, dated Aug. 25, 2017.
Response to Office Action, U.S. Appl. No. 15/607,626, dated Sep. 8, 2017.
Office Action, U.S. Appl. No. 15/607,624, dated Sep. 7, 2017.
Response to Office Action, U.S. Appl. No. 15/607,624, dated Sep. 15, 2017.
Office Action, U.S. Appl. No. 15/250,932, dated Sep. 7, 2017.
Response to Office Action, U.S. Appl. No. 15/250,932, dated Sep. 15, 2017.
Office Action, U.S. Appl. No. 15/607,624, dated Dec. 27, 2017.
Response to Office Action, U.S. Appl. No. 15/607,624, dated Jan. 25, 2018.
Office Action, U.S. Appl. No. 15/250,932, dated Jan. 11, 2018.
Response to Office Action, U.S. Appl. No. 15/250,932, dated Jan. 17, 2018.
Office Action, U.S. Appl. No. 15/607,626, dated Dec. 13, 2017.
Response to Office Action, U.S. Appl. No. 15/607,626, dated Jan. 25, 2018.
Office Action, U.S. Appl. No. 15/607,626, dated Apr. 5, 2018.
Response to Office Action, U.S. Appl. No. 15/607,626, dated Apr. 14, 2018.
Office Action, U.S. Appl. No. 15/607,624, dated Apr. 5, 2018.
Response to Office Action, U.S. Appl. No. 15/607,624, dated Apr. 14, 2018.
Office Action, U.S. Appl. No. 15/593,261, dated Oct. 2, 2018.
Response to Office Action, U.S. Appl. No. 15/593,261, dated Dec. 19, 2018.
Office Action, U.S. Appl. No. 15/593,268, dated May 24, 2018.
Response to Office Action, U.S. Appl. No. 15/593,268, dated Aug. 24, 2018.

(56) References Cited

OTHER PUBLICATIONS

Office Action, U.S. Appl. No. 15/593,282, dated Nov. 13, 2018.
Response to Office Action, U.S. Appl. No. 15/593,282, dated Nov. 17, 2018.
Office Action, U.S. Appl. No. 15/593,284, dated Nov. 14, 2018.
Response to Office Action, U.S. Appl. No. 15/593,284, dated Dec. 19, 2018.
Office Action, U.S. Appl. No. 15/593,287, dated Nov. 21, 2018.
Response to Office Action, U.S. Appl. No. 15/593,287, dated Dec. 19, 2018.
Office Action, U.S. Appl. No. 15/593,290, dated Nov. 14, 2018.
Response to Office Action, U.S. Appl. No. 15/593,290, dated Dec. 19, 2018.
Office Action, U.S. Appl. No. 15/593,293, dated May 31, 2018.
Response to Office Action, U.S. Appl. No. 15/593,293, dated Aug. 31, 2018.
Office Action, U.S. Appl. No. 15/593,296, dated Dec. 11, 2018.
Response to Office Action, U.S. Appl. No. 15/593,296, dated Dec. 19, 2018.
Office Action, U.S. Appl. No. 15/792,762, dated Jun. 8, 2018.
Response to Office Action, U.S. Appl. No. 15/792,762, dated Aug. 29, 2018.
Office Action, U.S. Appl. No. 15/593,300, dated Jun. 8, 2018.
Response to Office Action, U.S. Appl. No. 15/593,300, dated Aug. 29, 2018.
Office Action, U.S. Appl. No. 15/593,287, dated Feb. 4, 2019.
Response to Office Action, U.S. Appl. No. 15/593,287, dated May 3, 2019.
Office Action, U.S. Appl. No. 15/593,290, dated Feb. 4, 2019.
Response to Office Action, U.S. Appl. No. 15/593,290, dated May 3, 2019.
Office Action, U.S. Appl. No. 15/593,284, dated Feb. 4, 2019.
Response to Office Action, U.S. Appl. No. 15/593,284, dated May 3, 2019.

* cited by examiner

USER INTERFACE BASED ON DEVICE-STATE INFORMATION

CROSS REFERENCE TO RELATED APPLICATIONS

This application is related to U.S. Non-Provisional application Ser. No. 15/250,928, "User Interface Based on Device-State Information," by Gaylord Yu, filed on Aug. 30, 2016.

This application is also related to: U.S. patent application Ser. No. 15/607,621, "User Interface Based on Device-State Information," filed on May 29, 2017; U.S. patent application Ser. No. 15/607,619, "User Interface Based on Device-State Information," filed on May 29, 2017; U.S. patent application Ser. No. 15/593,300, "User Interface Based on Device-State Information," filed on May 11, 2017; U.S. patent application Ser. No. 15/593,296, "User Interface Based on Device-State Information," filed on May 11, 2017; U.S. patent application Ser. No. 15/593,293, "User Interface Based on Device-State Information," filed on May 11, 2017; U.S. patent application Ser. No. 15/593,290, "User Interface Based on Device-State Information," filed on May 11, 2017; U.S. patent application Ser. No. 15/593,287, "User Interface Based on Device-State Information," filed on May 11, 2017; U.S. patent application Ser. No. 15/593,284, "User Interface Based on Device-State Information," filed on May 11, 2017; U.S. patent application Ser. No. 15/593,282, "User Interface Based on Device-State Information," filed on May 11, 2017; U.S. patent application Ser. No. 15/593,268, "User Interface Based on Device-State Information," filed on May 11, 2017; U.S. patent application Ser. No. 15/593,261, "User Interface Based on Device-State Information," filed on May 11, 2017; and U.S. patent application Ser. No. 15/250,928, "User Interface Based on Device-State Information," filed on Aug. 30, 2016.

BACKGROUND

Field

The described embodiments relate to feedback techniques, including dynamically adapting a user interface based on device-state information and a state diagram of an entertainment device.

Related Art

The versatility and capabilities of portable electronic devices is increasing their popularity. For example, many portable electronic devices include touch-sensitive displays that allow users to dynamically interact with the portable electronic devices. In addition, many portable electronic devices can wirelessly communicate with other electronic devices, which allow the portable electronic devices to rapidly and conveniently communicate information. In particular, the portable electronic devices may include networking subsystem that implement a network interface, such as: a wireless network described in the Institute of Electrical and Electronics Engineers (IEEE) 802.11 standard, Bluetooth® (from the Bluetooth Special Interest Group of Kirkland, Wash.), and/or another type of wireless network. The combination of a user interface on a touch-sensitive display and wireless-communication capability can allow users to use portable electronic devices to remotely control another electronic device.

However, it can be difficult to use user interfaces. For example, many electronic devices, which can be wirelessly controlled using portable electronic devices, have complicated functionality. Because it is often difficult to adapt the user interfaces, a user can be forced to navigate through a complicated set of options, which may confuse the user. Consequently, the user may make errors, such as activating the wrong functionality or getting lost in a large set of options. These errors frustrate users, and can degrade the user experience.

SUMMARY

The described embodiments include a portable electronic device. This portable electronic device includes: a touch-sensitive display; an antenna; an interface circuit, coupled to the antenna, which communicates with an audio/video (A/V) hub; and a control circuit coupled to the touch-sensitive display and the interface circuit. During operation, the control circuit receives, via the interface circuit, device-state information from the A/V hub specifying a current state of an entertainment device. Then, the control circuit generates a user interface that includes one or more virtual command icons associated with the current state and one or more related states of the entertainment device that are related to the current state in a state diagram by corresponding operations that transition the entertainment device from the current state to the one or more related states. Next, the control circuit displays the user interface on the touch-sensitive display.

Note that the control circuit may receive, via the interface circuit, classification information for the entertainment device that specifies: a type of the entertainment device, a manufacturer of the entertainment device, and/or context information that specifies a context of A/V content displayed on the entertainment device. In these embodiments, the one or more virtual command icons may be based on: the type of the entertainment device, the manufacturer of the entertainment device, and/or the context.

Moreover, the control circuit may receive, via the interface circuit, activation information specifying activation of a virtual command icon in the one or more virtual command icons, where the activation of the virtual command icon specifies a transition of the entertainment device from the current state to a new current state in the state diagram. For example, the activation of the virtual command icon may involve a user of the portable electronic device contacting the touch-sensitive display within a strike area of the virtual command icon and then releasing the contact. In response to receiving the activation information, the control circuit may: modify the user interface to change the one or more virtual command icons based on the new current state; and display the modified user interface.

Furthermore, the user interface may exclude one or more additional virtual command icons associated with one or more unrelated states of the entertainment device that are unrelated to the current state by direct transitions in the state diagram.

In some embodiments, a given operation directly transitions the entertainment device from the current state to one of the additional states without passing through an intermediate state in the state diagram.

Note that the current state may include a power-off state of the entertainment device, and the one or more related states may only include a power-on state of the entertainment device. However, in other embodiments the current state includes one of a wide variety of states that are different than the power-off state or the power-on state.

Moreover, the generating and the displaying operations may be dynamically performed as the current state changes.

In some embodiments, the control circuit includes: a processor coupled to the touch-sensitive display and the interface circuit; and a memory, coupled to the processor, which stores a program module that is executed by the processor. The program module may include instructions for: the receiving, the generating, and the displaying.

Another embodiment provides the portable electronic device that tracks a current contact area (such as of a user's finger(s)) on the touch-sensitive display, and provides user-interface information to the A/V hub specifying the current contact area. This may allow the A/V hub to display a visual indication of the current contact area on an A/V display device.

Another embodiment provides a computer-program product for use with the portable electronic device. This computer-program product includes instructions for at least some of the operations performed by the portable electronic device.

Another embodiment provides a method for displaying the user interface. This method includes at least some of the operations performed by the portable electronic device.

Another embodiment provides the A/V hub, which includes: an antenna; an interface circuit, coupled to the antenna, which communicates with the portable electronic device (such as a cellular telephone or a remote control); and a control circuit coupled to the interface circuit. During operation, the control circuit in the A/V hub determines the device-state information for the entertainment device specifying the current state of the entertainment device. Then, the control circuit generates, based on the determined device-state information, user-interface information that specifies the user interface that includes the one or more virtual command icons associated with the current state and the one or more related states of the entertainment device that are related to the current state in the state diagram by corresponding operations that transition the entertainment device from the current state to the one or more related states. Next, the control circuit provides, via the interface circuit, the user interface to the portable electronic device.

Note that the control circuit may generate the user-interface information based on: the type of the entertainment device, the manufacturer of the entertainment device, and/or the context information that specifies the context of A/V content displayed on the entertainment device. Thus, in these embodiments, the one or more virtual command icons and their locations in the user interface may be based on: the type of the entertainment device, the manufacturer of the entertainment device, and/or the context.

Moreover, the control circuit may receive, via the interface circuit, the activation information specifying the activation of the virtual command icon in the one or more virtual command icons, where the activation of the virtual command icon specifies the transition of the entertainment device from the current state to the new current state in the state diagram. For example, the activation of the virtual command icon may involve a user of the portable electronic device contacting the touch-sensitive display within the strike area of the virtual command icon and then releasing the contact. In response to receiving the activation information, the control circuit may: modify the user-interface information to change the one or more virtual command icons based on the new current state; and provide, via the interface circuit, the modified user-interface information to the portable electronic device.

Furthermore, the user-interface information may exclude the one or more additional virtual command icons associated with the one or more unrelated states of the entertainment device that are unrelated to the current state by direct transitions in the state diagram.

In some embodiments, the given operation directly transitions the entertainment device from the current state to one of the additional states without passing through the intermediate state in the state diagram.

Note that the current state may include the power-off state of the entertainment device, and the one or more related states may only include the power-on state of the entertainment device. However, in other embodiments the current state includes one of the wide variety of states that are different than the power-off state or the power-on state.

Moreover, the generating and the displaying operations may be dynamically performed as the current state changes.

In some embodiments, the control circuit includes: a processor coupled to the interface circuit; and a memory, coupled to the processor, which stores a program module that is executed by the processor. The program module may include instructions for: the receiving, the generating, and the providing.

Another embodiment provides the A/V hub that receives user-interface information that specifies a current contact area (such as of a user's finger(s)) on the touch-sensitive display on the portable electronic device, and provides information to an A/V display device, so the A/V display device displays a visual indication of the current contact area relative to a representation of one or more virtual command icons in the user interface.

Another embodiment provides a computer-program product for use with the A/V hub. This computer-program product includes instructions for at least some of the operations performed by the A/V hub.

Another embodiment provides a method for providing the user-interface information. This method includes at least some of the operations performed by the A/V hub.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
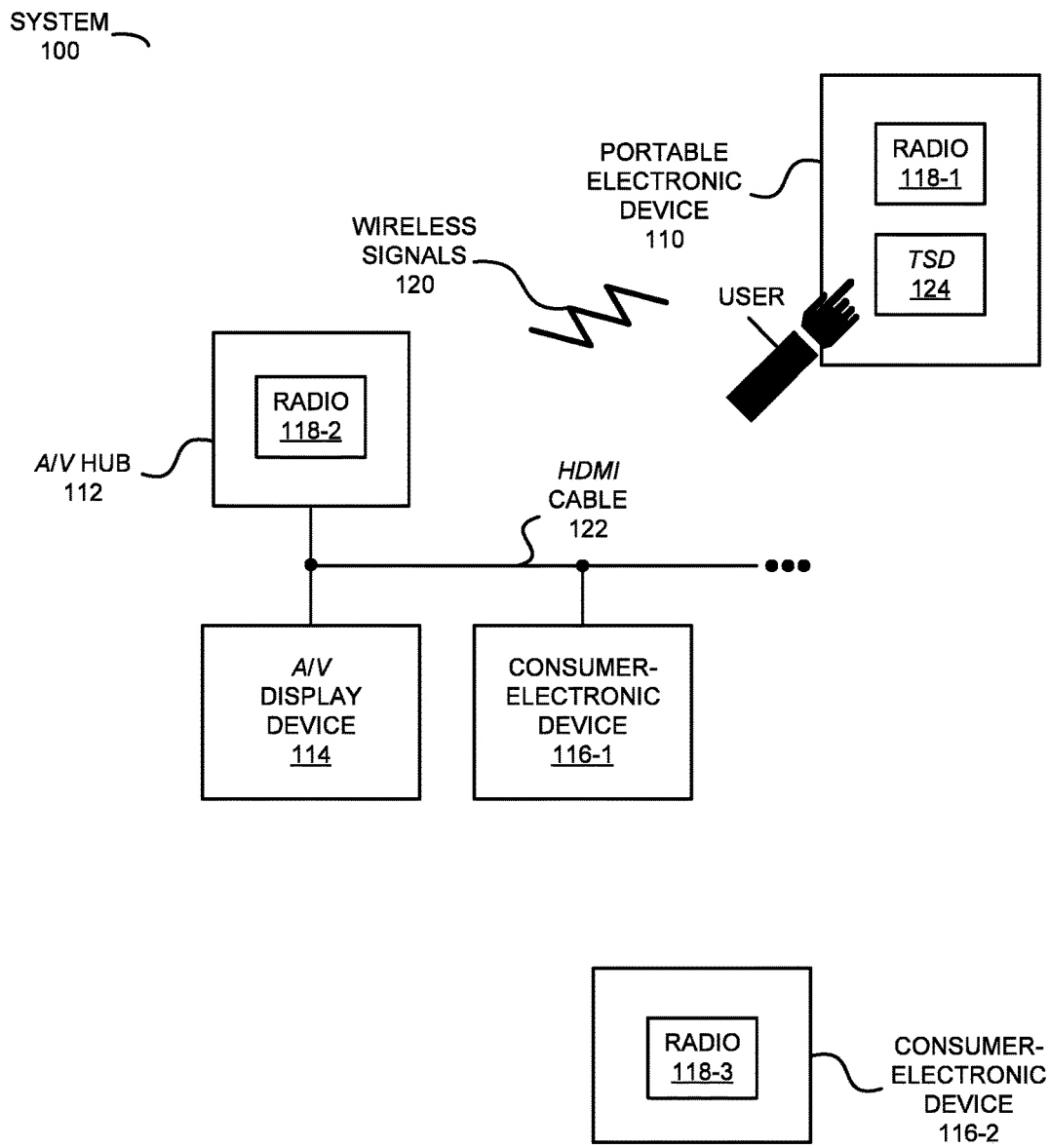
FIG. 1 is a block diagram illustrating a system with electronic devices wirelessly communicating in accordance with an embodiment of the present disclosure.

Table 1 provides sets of commands in menus for different entertainment devices in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

A portable electronic device with a touch-sensitive display (such as a cellular telephone) provides or functions as a wireless remote control for an entertainment device (such as a consumer-electronic device). Based on device-state information that specifies a current state of the entertainment device (which may be received from an audio/video (A/V) hub that communicates with the entertainment device) and one or more related states of the entertainment device, the portable electronic device may generate a user interface that includes one or more virtual command icons. Alternatively or additionally, based on the device-state information (which is determined by the A/V hub) and the one or more related states of the entertainment device, the A/V hub may generate user-interface information that specifies the user interface that includes the one or more virtual command icons, and the A/V hub may provide the user interface to the portable electronic device. Note that the one or more related states may be related to the current state in a state diagram by corresponding operations that transition the entertainment device from the current state to the one or more related states. Then, the portable electronic may display the user interface on the touch-sensitive display. In this way, the portable electronic device and/or the A/V hub may dynamically adapt the user interface.

By dynamically adapting the user interface based on the device-state information and the state diagram, this feedback technique may provide a simple, intuitive and clear user interface for a user to use. This dynamic user interface may simply user decisions by restricting the one or more virtual command icons to those that are relevant based on the current state and the one or more related states. Therefore, the feedback technique may make it easier for the user to use the portable electronic device as a wireless remote control, and may allow the user to effectively use the user interface to control the entertainment device (such as the A/V hub, an A/V display device and/or a consumer-electronic device) with fewer errors or mistakes. Consequently, the feedback technique may improve the user experience when using the portable electronic device, the A/V hub and the entertainment device.

In the discussion that follows the portable electronic device, the A/V hub and/or the A/V display device may include radios that communicate packets or frames in accordance with one or more communication protocols, such as: an Institute of Electrical and Electronics Engineers (IEEE) 802.11 standard (which is sometimes referred to as 'Wi-Fi®,' from the Wi-Fi® Alliance of Austin, Tex.), Bluetooth® (from the Bluetooth Special Interest Group of Kirkland, Wash.), a cellular-telephone communication protocol, a near-field-communication standard or specification (from the NFC Forum of Wakefield, Mass.), and/or another type of wireless interface. In the discussion that follows, Wi-Fi is used as an illustrative example. For example, the cellular-telephone communication protocol may include or may be compatible with: a $2^{nd}$ generation of mobile telecommunication technology, a $3^{rd}$ generation of mobile telecommunications technology (such as a communication protocol that complies with the International Mobile Telecommunications-2000 specifications by the International Telecommunication Union of Geneva, Switzerland), a $4^{th}$ generation of mobile telecommunications technology (such as a communication protocol that complies with the International Mobile Telecommunications Advanced specification by the International Telecommunication Union of Geneva, Switzerland), and/or another cellular-telephone communication technique. In some embodiments, the communication protocol includes Long Term Evolution or LTE. However, a wide variety of communication protocols may be used. In addition, the communication may occur via a wide variety of frequency bands. Note that the portable electronic device, the A/V hub and/or the A/V display device may communicate using infra-red communication that is compatible with an infra-red communication standard (including unidirectional or bidirectional infra-red communication).

Communication among electronic devices is shown in FIG. 1, which presents a block diagram illustrating a system 100 with a portable electronic device 110 (such as a remote control or a cellular telephone), an A/V hub 112, A/V display device 114 (such as a television, a monitor, a computer and, more generally, a display associated with an electronic device) and one or more consumer-electronic devices 116 (e.g., a radio receiver, a video player, a satellite receiver, an access point that provides a connection to a wired network such as the Internet, a media or a content source, a consumer-electronic device, a set-top box, over-the-top content delivered over the Internet or a network without involvement of a cable, satellite or multiple-system operator, etc.). (Note that A/V hub 112, A/V display device 114, and the one or more consumer-electronic devices 116 are sometimes collectively referred to as 'components' in system 100. However, A/V hub 112, A/V display device 114, and the one or more consumer-electronic devices 116 are sometimes referred to as entertainment devices.) In particular, portable electronic device 110 and A/V hub 112 may communicate with each other using wireless communication, and A/V hub 112 and other components in system 100 (such as A/V display device 114 and the one or more consumer-electronic devices 116) may communicate using wireless and/or wired communication. During the wireless communication, these electronic devices may wirelessly communicate while: transmitting advertising frames on wireless channels, detecting one another by scanning wireless channels, establishing connections (for example, by transmitting association requests), and/or transmitting and receiving packets or frames (which may include the association requests and/or additional information as payloads, such as user-interface information, device-state information, user-interface activity information, data, A/V content, etc.).

Figure 21:
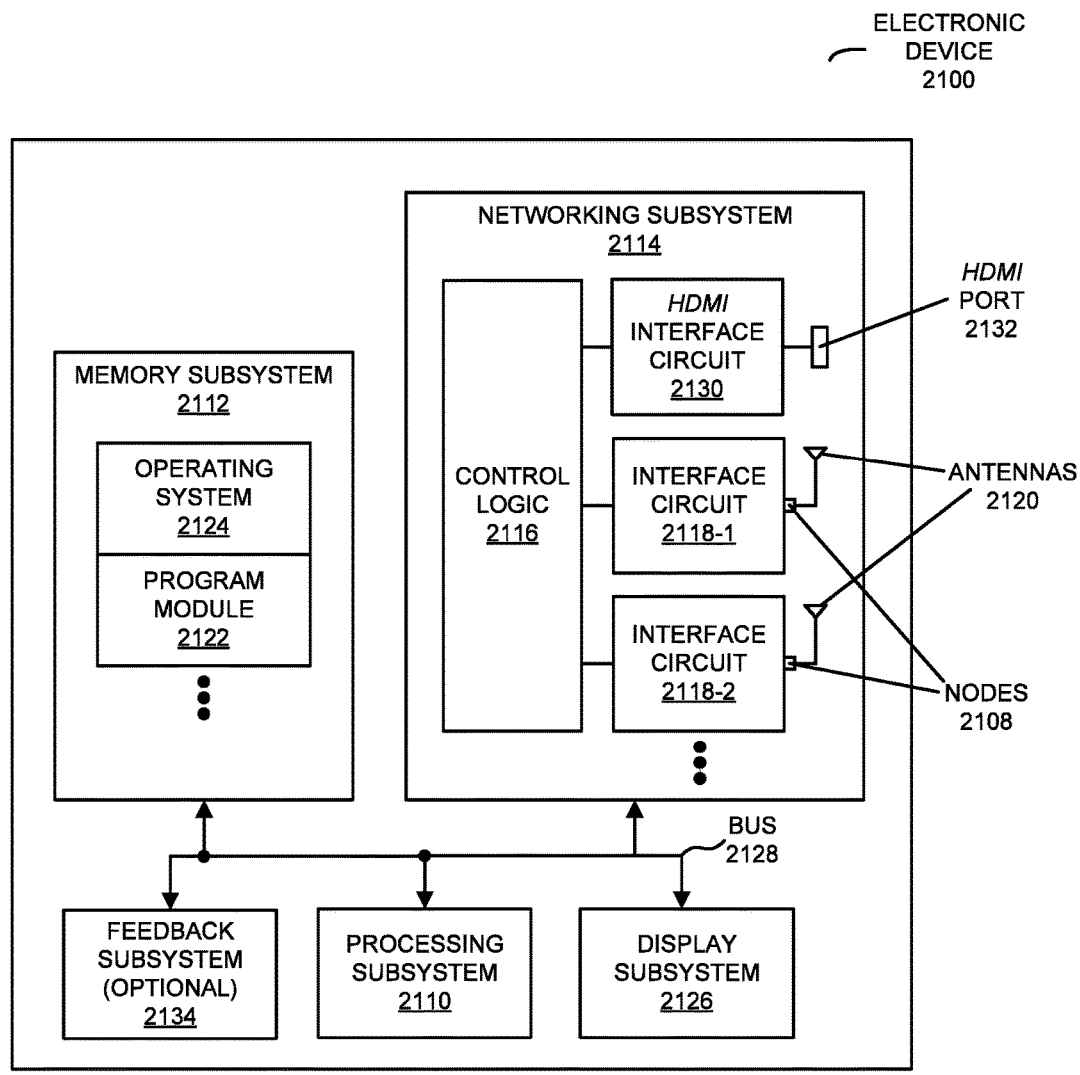
FIG. 21 is a block diagram illustrating one of the electronic devices of FIG. 1 in accordance with an embodiment of the present disclosure.

As described further below with reference to FIG. 21, portable electronic device 110, A/V hub 112, A/V display device 114 and the one or more consumer-electronic devices 116 may include subsystems, such as: a networking subsystem, a memory subsystem and a processor subsystem. In addition, portable electronic device 110 and A/V hub 112, and optionally one or more of A/V display device 114 and/or the one or more consumer-electronic devices 116, may include radios 118 in the networking subsystems. (Note that radios 118 may be instances of the same radio or may be different from each other.) More generally, portable electronic device 110 and A/V hub 112 (and optionally one or more of A/V display device 114 and/or the one or more consumer-electronic devices 116) can include (or can be included within) any electronic devices with the networking subsystems that enable portable electronic device 110 and A/V hub 112 (and optionally one or more of A/V display device 114 and/or the one or more consumer-electronic devices 116) to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security), transmit and receive packets or frames via the connection, etc.

As can be seen in FIG. 1, wireless signals 120 (represented by a jagged line) are transmitted from radio 118-1 in portable electronic device 110. These wireless signals are received by at least A/V hub 112. In particular, portable electronic device 110 may transmit packets. In turn, these packets may be received by a radio 118-2 in A/V hub 112. This may allow portable electronic device 110 to communicate information to A/V hub 112. While FIG. 1 illustrates portable electronic device 110 transmitting packets, note that portable electronic device 110 may also receive packets from A/V hub 112.

In the described embodiments, processing of a packet or frame in portable electronic device 110 and A/V hub 112 (and optionally one or more of A/V display device 114 and/or the one or more consumer-electronic devices 116) includes: receiving wireless signals 120 with the packet or frame; decoding/extracting the packet or frame from received wireless signals 120 to acquire the packet or frame; and processing the packet or frame to determine information contained in the packet or frame (such as the information associated with a data stream). For example, the information from portable electronic device 110 may include user-interface activity information associated with a user interface displayed on touch-sensitive display 124 in portable electronic device 110, which a user of portable electronic device 110 uses to control A/V hub 112, A/V display device 114 and/or one of the one or more consumer-electronic devices 116. Alternatively, the information from A/V hub 112 may include device-state information about a current device state of A/V display device 114 or one of the one or more consumer-electronic devices 116 (such as on, off, play, rewind, fast forward, a selected channel, selected content, a content source, etc.), or may include user-interface information for the user interface (which may be dynamically updated based on the device-state information and/or the user-interface activity information). Furthermore, the information from A/V hub 112 and/or one of the one or more consumer-electronic devices 116 may include audio and video that are displayed on A/V display device 114. (However, as noted previously, the audio and video may be communicated between components in system 100 via wired communication. Therefore, as shown in FIG. 1, there may be a wired cable or link, such as a high-definition multimedia-interface (HDMI) cable 122, between A/V hub 112 and A/V display device 114.)

Note that the communication between portable electronic device 110 and A/V hub 112 (and optionally one or more of A/V display device 114 and/or the one or more consumer-electronic devices 116) may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a channel or link), and/or a ratio of an actual data rate to an estimated data rate (which is sometimes referred to as 'utilization'). Moreover, the performance during the communication associated with different channels may be monitored individually or jointly (e.g., to identify dropped packets).

The communication between portable electronic device 110 and A/V hub 112 (and optionally one or more of A/V display device 114 and/or the one or more consumer-electronic devices 116) in FIG. 1 may involve one or more independent, concurrent data streams in different wireless channels (or even different Wi-Fi communication protocols) in one or more connections or links, which may be communicated using multiple radios. Note that the one or more connections or links may each have a separate or different service set identifier on a wireless network in system 100 (which may be a proprietary network or a public network). Moreover, the one or more concurrent data streams may, on a dynamic or packet-by-packet basis, be partially or completely redundant to improve or maintain the performance metrics even when there are transient changes (such as interference, changes in the amount of information that needs to be communicated, movement of portable electronic device 110, etc.), and to facilitate services (while remaining compatible with the Wi-Fi communication protocol) such as: channel calibration, determining of one or more performance metrics, performing quality-of-service characterization without disrupting the communication (such as performing channel estimation, determining link quality, performing channel calibration and/or performing spectral analysis associated with at least one channel), seamless handoff between different wireless channels, coordinated communication between components, etc. These features may reduce the number of packets that are resent, and, thus, may decrease the latency and avoid disruption of the communication and may enhance the experience of one or more users or viewers of content on A/V display device 114.

As noted previously, a user may control A/V hub 112, A/V display device 114 and/or one of the one or more consumer-electronic devices 116 via the user interface displayed on touch-sensitive display 124 on portable electronic device. In particular, at a given time, the user interface may include one or more virtual icons that allow the user to activate, deactivate or change functionality or capabilities of A/V hub 112, A/V display device 114 and/or one of or more consumer-electronic devices 116. For example, a given virtual icon in the user interface may have an associated strike area on a surface of touch-sensitive display 124. If the user makes and then breaks contact with the surface (e.g., using one or more fingers or digits, or using a stylus) within the strike area, portable electronic device 110 (such as a processor executing a program module) may receive user-interface activity information indicating activation of this command or instruction from a touch-screen input/output (I/O) controller, which is coupled to touch-sensitive display 124. (Alternatively, touch-sensitive display 124 may be responsive to pressure. In these embodiments, the user may maintain contact with touch-sensitive display 124 with an average contact pressure that is usually less than a threshold value, such as 10-20 kPa, and may activate a given virtual icon by increase the average contact pressure with touch-sensitive display 124 above the threshold value.) In response, the program module may instruct an interface circuit in portable electronic device 110 to wirelessly communicate the user-interface activity information indicating the command or instruction to A/V hub 112, and A/V hub 112 may communicate the command or the instruction to the target component in system 100 (such as A/V display device 114). This instruction or command may result in A/V display device 114 turning on or off, displaying content from a particular source, performing a trick mode of operation (such as fast forward, reverse, fast reverse or skip), etc.

One problem with using existing remote controls to control the operation of another component or entertainment device is that the remote control does not receive any feedback from the entertainment device. For example, many existing remote controls use infra-red communication. However, typically existing infra-red communication protocols are unidirectional or one-way communication, i.e., from a remote control to the entertainment device. Consequently, the remote control usually does not have any knowledge of the effects of the commands or instructions that are communicated to the entertainment device. In particular, the remote control is typically unaware of a current state of the entertainment device, such as whether the entertainment device is in: a power-on state, a power-off state, a playback state, a trick-mode state (such as fast forward, fast reverse, or skip), a pause state, a standby (reduced-power) state, a record state, a state in which content associated with a given content source (such as cable television, a satellite network, a web page on the Internet, etc.) is received or provided, and/or another state. (Note that one or more of the states may be nested or concurrent with each other, such as the power-on state and the playback state.) By operating blindly in this way, existing remote control are unable to leverage knowledge of the current state of the entertainment device to improve the user experience.

This problem is addressed in system 100. In particular, as described further below with reference to FIGS. 2 and 3, A/V hub 112 may determine the current state of one or more of the components in system 100, such as the current state of A/V display device 114 and/or one of the one or more consumer-electronic devices 116. This device-state information may be determined by A/V hub 112 using hardware and/or software, and A/V hub 112 may determine the device-state information even for legacy entertainment devices that are only capable of receiving commands or instructions (i.e., that are only capable of unidirectional communication). For example, as described further below with reference to FIGS. 11 and 12, whether or not a given component or entertainment device in system 100 is electrically coupled to A/V hub 112 may be determined using a state-detection circuit that detects whether there is electrical coupling between the entertainment device and an input connector to A/V hub 112 (such as an HDMI connector or port that can be electrically coupled to HDMI cable 122). If the electrical coupling is detected, the type of the given entertainment device (such as a television, a DVD player, a satellite receiver, etc.) and/or the manufacturer or provider of the given entertainment device may be determined by A/V hub 112 by providing a series of commands or instructions to the given entertainment device (e.g., such as commands or instructions that are specific to a particular type of entertainment device, specific to a particular manufacturer, and/or consumer-electronics-control commands in the HDMI standard or specification), and then monitoring, as a function of time, changes in a data stream (as indicated by the number of packets or frames and/or the payloads in the packets or frames) to and/or from the given entertainment device to see if there was a response to a particular command or instruction. Moreover, the state-detection circuit may determine whether the given entertainment device is in the power-on state or the power-off state by monitoring a voltage, a current and/or an impedance on, through or associated with one or more pins in the input connector. Alternatively or additionally, A/V hub 112 may determine whether the given entertainment device is in the power-on state or the power-off state by monitoring, as a function of time, the data stream (as indicated by the number of packets or frames and/or the payloads in the packets or frames) to and/or from the given entertainment device. Similarly, A/V hub 112 may determine the current state of the given entertainment device, such as whether the given entertainment device responded to a command or instruction that was provided to the given entertainment device by A/V hub 112, by monitoring, as a function of time, changes in the data stream (as indicated by the number of packets or frames and/or the payloads in the packets or frames) to and/or from the given entertainment device. Thus, the device-state information for the given entertainment device determined by A/V hub 112 may include: presence or absence information (such as whether there is electrical coupling or a wireless connection with the given entertainment device), identity information (such as the type of the given entertainment device and/or the manufacturer of the given entertainment device) and/or the current state.

Using the device-state information A/V hub 112 and/or portable electronic device 110 may dynamically adapt the user interface displayed on touch-sensitive display 124 on portable electronic device 110. For example, as described further below with reference to FIGS. 4 and 5, A/V hub 112 may provide, via radio 118-2, device-state information to portable electronic device 110 specifying a current state of the given entertainment device. (Thus, the feedback technique may include bidirectional or two-way communication between A/V hub 112 and portable electronic device 110.) As shown in FIGS. 14-20, after radio 118-1 receives the device-state information, portable electronic device 110 (such as a program module executed in an environment, e.g., an operating system, in portable electronic device 110) may generate a user interface that includes one or more virtual command icons associated with the current state and one or more related states of the given entertainment device. As illustrated by the available commands shown in FIG. 13, the one or more related states may be related to the current state in a state diagram (which may be stored in memory in portable electronic device 110) by corresponding operations that transition the given entertainment device from the current state to the one or more related states. Then, portable electronic device 110 may display the user interface on touch-sensitive display 124.

In some embodiments, A/V hub 112 provides information specifying the type of the given entertainment device, the manufacturer of the given entertainment device, and/or context information that specifies a context of content (such as A/V content) displayed on the entertainment device (such as A/V display device 114). For example, the context may include a type of the content (such as sports, television, a movie, etc.), a location in the content (such as a timestamp, an identifier of a sub-section in the content and/or a proximity to a beginning or an end of the content), etc. In these embodiments, the one or more virtual command icons (and, thus, the user interface) may be based on the type of the given entertainment device, the manufacturer and/or the context. Thus, only virtual command icons that are relevant to the given entertainment device, the manufacturer and/or the context may be included in the user interface.

Moreover, when the user activates one of the virtual command icons in the user interface, the touch-screen I/O controller in portable electronic device 110 may provide user-interface activity information specifying activation of a virtual command icon in the one or more virtual command icons, where the activation of the virtual command icon specifies a transition of the given entertainment device from the current state to a new current state in the state diagram. As noted previously, the activation of the virtual command icon may involve a user of portable electronic device 110 contacting touch-sensitive display 124 within a strike area of the virtual command icon and then releasing the contact. In response to receiving the user-interface activity information, portable electronic device 110 may: modify the user interface to change the one or more virtual command icons based on the new current state; and display the modified user interface on touch-sensitive display 124. Note that portable electronic device 110 may wait to change the one or more virtual command icons until the device-state information received from A/V hub 112 indicates that the given entertainment device has transitioned to the new current state in response to a command or an instruction associated with the activation of the one of the virtual command icons. Thus, portable electronic device 110 may repeatedly perform the generating and the displaying operations so that the user interface is dynamically updated as the current state changes.

Figure 6:
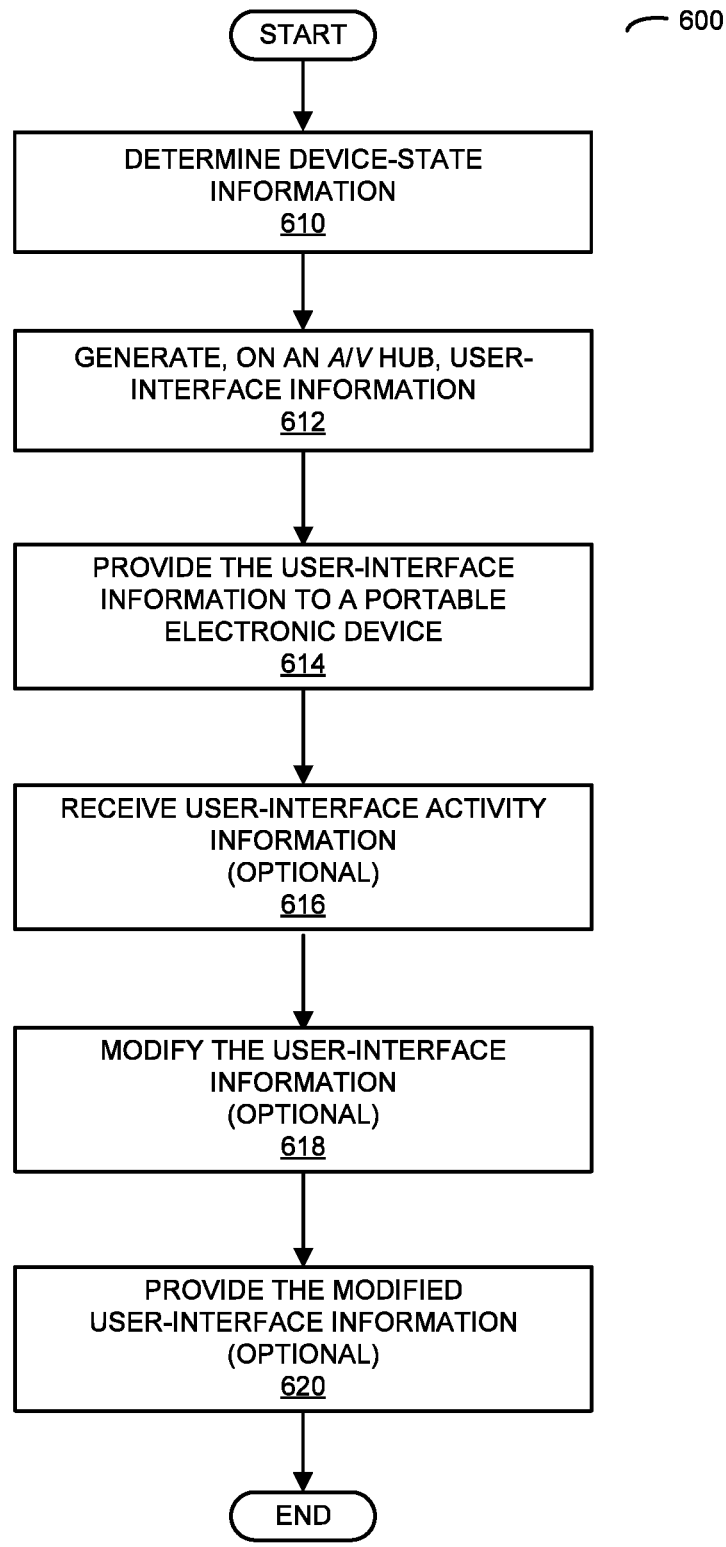
FIG. 6 is a flow diagram illustrating a method for providing a user interface in accordance with an embodiment of the present disclosure.

Alternatively or additionally, as described further below with reference to FIGS. 6 and 7, instead of portable electronic device 110 generating the user interface, A/V hub 112 may generate user-interface information that specifies the user interface (or instructions specifying objects or graphical information in the user interface) based on the one or more related states in the state diagram (which may be stored in memory in A/V hub 112) and one or more of: the device-state information, the type of the given entertainment device, the manufacturer of the given entertainment device, the context, and/or user-interface activity information specifying activation (by the user) of one of the virtual command icons in the user interface (which may be received, via radios 118, from portable electronic device 110). Then, A/V hub 112 may provide, via radios 118, the user-interface information to portable electronic device 110 for display on touch-sensitive display 124.

Furthermore, as described further below with reference to FIGS. 8-10, the device-state information may be used by portable electronic device 110 to ensure that commands or instructions have been received and executed by the designated recipient entertainment device in system 100. If the device-state information indicates that a command or instruction was not executed, portable electronic device 110 may resent the command or instruction. Alternatively, if the device-state information indicates that the command or instruction is being processed, portable electronic device 110 may not resent the command or instruction, and may provide feedback to the user of portable electronic device 110 so that the user is aware that the command or instruction is being processed and may not continue to activate a virtual command icon in the user interface in frustration.

The feedback may originate on portable electronic device 110 and/or A/V hub 112. For example, in response to device-state information, portable electronic device 110 (such as a processor executing a program module) may: generate and display in the user interface a visual indicator that the change in the state of the entertainment device is being implemented; and/or activate a sensory-feedback mechanism (such as a vibration mechanism, a vibration actuator, a light, or a speaker). Alternatively, A/V hub 112 (such as a processor executing a program module) may: generate and provide, via the interface circuit in A/V hub 112, the visual indicator to portable electronic device 110 for display in the user interface to indicate that the change in the state of the entertainment device is being implemented; and/or provide a sensory-feedback instruction that activates the sensory-feedback mechanism in portable electronic device 110.

In some embodiments, A/V hub 112 may generate the visual indicator based on the user-interface activity information. Then, A/V hub 112 may provide, via the interface circuit in A/V hub 112, the visual indicator to A/V display device 114 for display on A/V display device 114. Note that the visual indicator displayed on A/V display device 114 may indicate that the function associated with the virtual command icon is being processed or implemented. For example, the visual indicator may include graphical information, such as flashing a representation of the virtual command icon, changing a line thickness in the virtual command icon and/or adding a graphical symbol (such as an hour glass or a watch face). Note that A/V display device 114 may display the visual indicator on the A/V display device along with content, such as A/V content that is generated by A/V hub 112 and/or one of the one or more consumer-electronic devices 116. In particular, the visual indicator may be superimposed on or over the A/V content. Moreover, the visual indicator may be partially transparent so that the A/V content is visible underneath the visual indicator when displayed on A/V display device 114. In an exemplary embodiment, the visual indicator may include spatial information or graphical information that summarizes the current spatial configuration of the user interface (including one or more virtual icons, their functions and/or the associated strike areas), as well as the currently activated virtual command icon.

Furthermore, the visual indicator may include or specify a current contact area of a user's finger(s), a stylus or a pen on touch-sensitive display 124, which may allow the user to navigate to a virtual command icon by looking at A/V display device 114 instead of the user interface displayed on touch-sensitive display 124. This capability may be useful to the user, such as in cold environments where the user and portable electronic device 110 may be covered by a blanket. In a variation on this embodiment, the visual indicator may specify or represent a current location in the user interface and/or touch-sensitive display 124 that is activated. This may be useful in embodiments where the user interacts with the user interface without contacting the surface of touch-sensitive display 124 (such as based on time-of-flight measurements, a laser pointer, etc.).

In this way, the user interface may be dynamically updated as the components in system 100 respond to commands or instructions received from portable electronic device 110 and/or A/V hub 112, so that the currently relevant one or more virtual icons are included in the user interface. This capability may simplify the user interface and make it easier for the user to navigate through and/or use the user interface. Alternatively or additionally, portable electronic device 110 may ensure that commands or instructions are resent, as needed. Consequently, the feedback technique may reduce user errors and/or confusion when using portable electronic device 110 and/or A/V hub 112, and may ensure that components in system 100 respond to user commands and instructions, which individually and/or collectively may improve the user experience.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames. While portable electronic device 110 and A/V hub 112 are illustrated with a single instance of radios 118, in other embodiments portable electronic device 110 and A/V hub 112 (and optionally one or more of A/V display device 114 and/or the one or more consumer-electronic devices 116) may include multiple radios.

Figure 2:
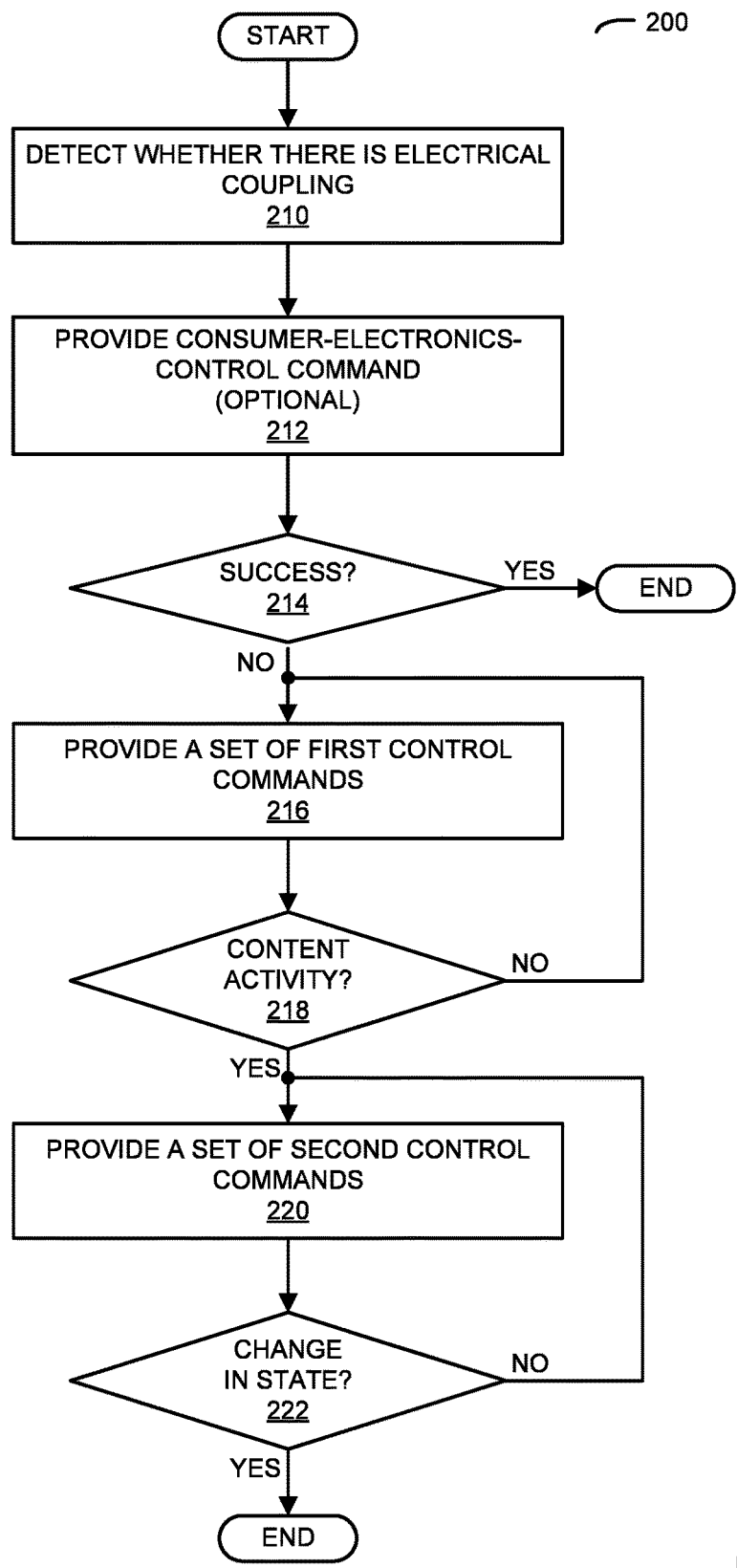
FIG. 2 is a flow diagram illustrating a method for identifying an entertainment device in accordance with an embodiment of the present disclosure

We now describe embodiments of a feedback technique. FIG. 2 presents a flow diagram illustrating method 200 for identifying an entertainment device, which may be performed by an A/V hub, such as A/V hub 112 (FIG. 1). This A/V hub may include: an input connector that can electrically couple to an entertainment device, where the input connector is compatible with a high-definition multimedia-interface (HDMI) standard; and a state-detection circuit coupled to at least one pin in the input connector (such as a transition minimized differential signaling or TMDS data1 shield), where, when the entertainment device is electrically coupled to the input connector, the state-detection circuit establishes a ground loop between the electronic device and the entertainment device. During operation, the A/V hub (such as a control circuit or control logic, e.g., a processor executing a program module and/or or a circuit, which is electrically coupled to the input connector and/or the state-detection circuit) detects whether there is electrical coupling (operation 210) between the entertainment device and the input connector using the state-detection circuit.

When the electrical coupling is detected (operation 210), the A/V hub provides a set of first control commands (operation 216) associated with different types of entertainment devices until, in response, the A/V hub detects content activity (operation 218) via the input connector. Note that the set of first control commands may include: power-on control commands for the different providers of entertainment devices; and/or power-off control commands for the different providers of entertainment devices. Moreover, the set of first commands may include: a play command for the different types of entertainment devices; and/or a trick-mode command for the different types of entertainment devices. (More generally, the set of first control commands may include commands associated with a variety of states of the entertainment device and/or which may result in a variety of changes in the state of the entertainment device.) Furthermore, the content activity may include A/V content that is at least one of provided and received by the entertainment device. In an exemplary embodiment, power-on control commands or play commands for different types of entertainment devices (such as a DVD player, a satellite receiver, etc.) may be provided to the entertainment device until the content activity is detected (such as significant increase or decrease in the number of packets or frames communicated to and/or from the entertainment device).

When the content activity is detected (operation 218), the A/V hub provides a set of second control commands (operation 220) associated with different providers of entertainment devices until the A/V hub detects a change in a state (operation 222) of the entertainment device via the input connector and the state-detection circuit. Note that the set of second control commands may include commands associated with a variety of states of the entertainment device and/or which may result in a variety of changes in the state of the entertainment device. In an exemplary embodiment, power-off control commands or standby control commands associated with different providers for the type of entertainment device may be provided to the entertainment device until the change in the state is detected (such as significant change in the number of packets or frames communicated to and/or from the entertainment device).

Furthermore, when the electrical coupling between the entertainment device and the input connector is detected (operation 210) and before providing the set of first control commands (operation 216), the A/V hub may attempt to identify the entertainment device by optionally providing consumer-electronics-control commands (operation 212) to the entertainment device (which may include commands supported by the Consumer Electronics Control capability supported by the HDMI standard and certain entertainment devices). If the attempt is unsuccessful (operation 214), then the A/V hub may provide the set of first control commands (operation 216). (Thus, the A/V hub may use the set of first control commands and/or a set of second control commands to identify at least some entertainment devices without using the Consumer Electronics Control capability.)

As described further below with reference to FIG. 11, the state-detection circuit may include: an energy-dissipation component (such as a resistor) electrically coupled to a power-supply voltage and at least the one pin; an energy-storage component (such as a capacitor) electrically coupled to at least the one pin and ground; and a bi-directional voltage clamp (such as a varistor or a Verner diode), in parallel with the energy-storage component, electrically coupled to at least the one pin and ground.

Moreover, detecting whether there is electrical coupling between the entertainment device and the input connector (operation 210) may involve: setting at least the one pin as an input, where at least the one pin is then pulled to the power-supply voltage by the A/V hub; measuring a voltage on at least the one pin; and detecting the electrical coupling between the entertainment device and the input connector when the voltage on at least the one pin is less than or equal to a predefined value (such as when the voltage on at least the one pin is approximately ground).

Furthermore, when the electrical coupling between the entertainment device and the input connector is detected (operation 210), the A/V hub may: set at least the one pin as an output and electrically couple at least the one pin to ground; and measure a second voltage on a hotplug-detect pin in the input connector. When the second voltage on the hotplug-detect pin is less than or equal to the predefined value, the A/V hub may set at least the one pin as an input and repeat the measurement of the voltage on at least the one pin. Alternatively, when the voltage equals or exceeds a second predefined value (such as when the voltage is approximately the power-supply voltage), the A/V hub may repeat the detecting whether there is electrical coupling between the entertainment device and the input connector (operation 210). Additionally, when the voltage is less than or equal to the predefined value, the A/V hub may identify the state of the entertainment device (e.g., the A/V hub may provide the set of first control commands, provide the set of second control commands, and/or may monitor the content activity, such as a data stream to and/or from the entertainment device). Note that the state may include: powered off; and standby. However, the state may include a variety of other states.

Additionally, when the second voltage on the hotplug-detect pin is less than or equal to the predefined value and when the voltage is less than or equal to the predefined value, the A/V hub may repeat setting at least the one pin as the output and electrically coupling at least the one pin to ground.

Note that based on the first control command(s) that resulted in the content activity and the second control command(s) that resulted in the change in the state, the entertainment device may be identified. Moreover, based on the identified entertainment device, the A/V hub may access one or more predefined and/or predetermined commands associated with the entertainment device. Then, using device-state information for the entertainment device, a user interface displayed on the portable electronic device and/or on a display in an A/V hub display device may be dynamically adapted or adjusted.

Figure 3:
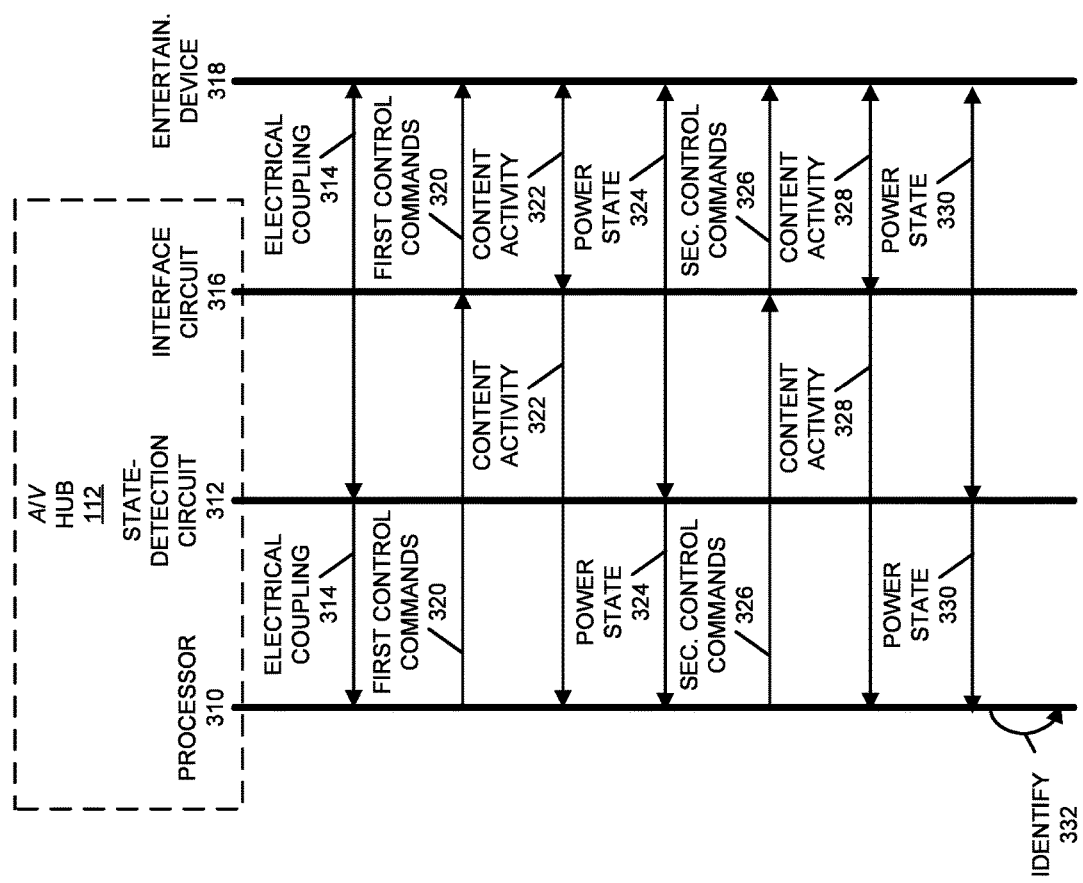
FIG. 3 is a drawing illustrating communication among the electronic devices in FIG. 1 in accordance with an embodiment of the present disclosure.

FIG. 3 presents a drawing illustrating communication among the electronic devices in FIG. 1, which presents a drawing illustrating communication between portable electronic device 110, A/V hub 112 and entertainment device 310. In particular, processor 310 and state-detection circuit 312 may detect electrical coupling 314 with entertainment device 318. When electrical coupling 314 is detected, processor 310 may instruct interface circuit 316 to provide the set of first control commands 320 to entertainment device 318. Then, processor 310 may, via interface circuit 316, monitor content activity 322 associated with entertainment device 318 (such as content activity represented by a data stream between entertainment device 318 and A/V hub 112). Alternatively or additionally, processor 310 may, via state-detection circuit 312, determine a change in power state 324.

When content activity 322 and/or a change in power state 324 is detected (which indicates that entertainment device 318 responded to a particular first control command, and thus specifies a type of entertainment device 318), processor 310 may instruct interface circuit 316 to provide the set of second control commands 326 to entertainment device 318. Furthermore, processor 310 may, via interface circuit 316, monitor content activity 328 associated with entertainment device 310 (such as content activity represented by a data stream between entertainment device 318 and A/V hub 112). Alternatively or additionally, processor 310 may, via state-detection circuit 312, determine a change in power state 330. A change in content activity 328 and/or power state 330 for a particular second control command may specify the provider of entertainment device 318.

Using the type of the entertainment device and the provider of entertainment device 318, processor 310 may identify 332 entertainment device 318.

In an exemplary embodiment, when state-detection circuit 312 detects electrical coupling 314 with entertainment device 318, processor 310 instructs interface circuit 316 to provide power-on commands for certain manufacturers or providers of consumer-electronic devices (or entertainment devices) and/or for certain types or classes of consumer-electronic devices. A response to a particular power-on command may provide initial classification information, which may specify the manufacturer or provider of a consumer-electronic device, or a class or type of consumer-electronic device (such as a DVD player). Note that the power-on commands may be provided in an intelligent manner. For example, the power-on command for a low-probability consumer-electronic device (such as a regular, non-Blu-ray DVD player) may be provided last. In contrast, the power-on command for a high-probability consumer-electronic device (such as a set-top box), which may be the majority of the consumer-electronic devices that are used with the A/V hub, may be provided first.

After determining the initial classification information, processor 310 may instruct interface circuit 316 to provide play or another menu command(s) to refine the classification information by determining a sub-type classification. For example, there may be three different types of DVD players from a particular manufacturer (which are used as an illustration of a consumer-electronic device). Based on differences in the menu of commands available to a remote control for the three different types of DVD players, the other menu command(s) may be selected. The response to the other menu command(s) may provide differential information that allows the classification information to be refined. Thus, a play command may be sent to one type of DVD player, and a stop command may be sent to another type of DVD player.

The determined classification information may allow the user interface to be automatically customized for the specific type of DVD player that the user has, without requiring that the user is aware of any of the specific details (such as the specific numerical model number that they purchased). Instead, all the user needs to know is that they have a DVD player from a particular manufacturer (as opposed to the specific type of DVD player).

Figure 4:
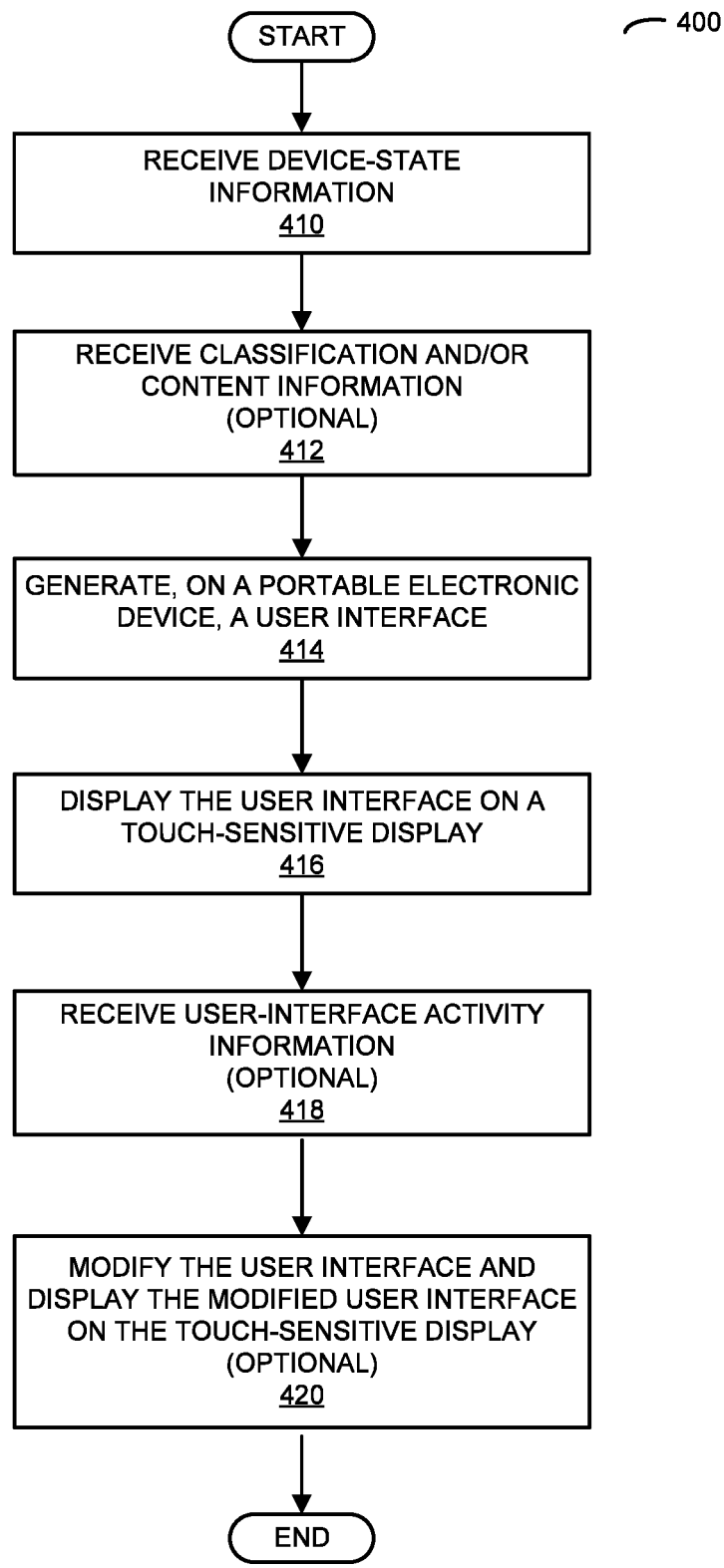
FIG. 4 is a flow diagram illustrating a method for displaying a user interface in accordance with an embodiment of the present disclosure.

FIG. 4 presents embodiments of a flow diagram illustrating method 400 for displaying a user interface, which may be performed by a portable electronic device, such as portable electronic device 110 (FIG. 1). During operation, the portable electronic device receives, via an interface circuit in the portable electronic device, device-state information (operation 410) from an A/V hub specifying a current state of an entertainment device. Then, the portable electronic device generates a user interface (operation 414) that includes one or more virtual command icons associated with the current state and one or more related states of the entertainment device that are related to the current state in a state diagram by corresponding operations that transition the entertainment device from the current state to the one or more related states. Next, the portable electronic device displays the user interface on a touch-sensitive display (operation 416).

In some embodiments, the portable electronic device optionally receives, via the interface circuit, classification information for the entertainment device (which specifies a type of the entertainment device and/or a manufacturer of the entertainment device), and/or context information (operation 412) that specifies a context of A/V content displayed on the entertainment device. In these embodiments, the portable electronic device generates the user interface (operation 414) based on: the type of the entertainment device, the manufacturer of the entertainment device, and/or the context.

Moreover, the portable electronic device may optionally receive, via the interface circuit, user-interface activity information (operation 418) specifying activation of a virtual command icon in the one or more virtual command icons, where the activation of the virtual command icon specifies a transition of the entertainment device from the current state to a new current state in the state diagram. For example, the activation of the virtual command icon may involve a user of the portable electronic device contacting the touch-sensitive display within a strike area of the virtual command icon and then releasing the contact. In response to receiving the user-interface activity information, the portable electronic device may optionally: modify the user interface (operation 420) to change the one or more virtual command icons based on the new current state; and display the modified user interface (operation 420).

Figure 5:
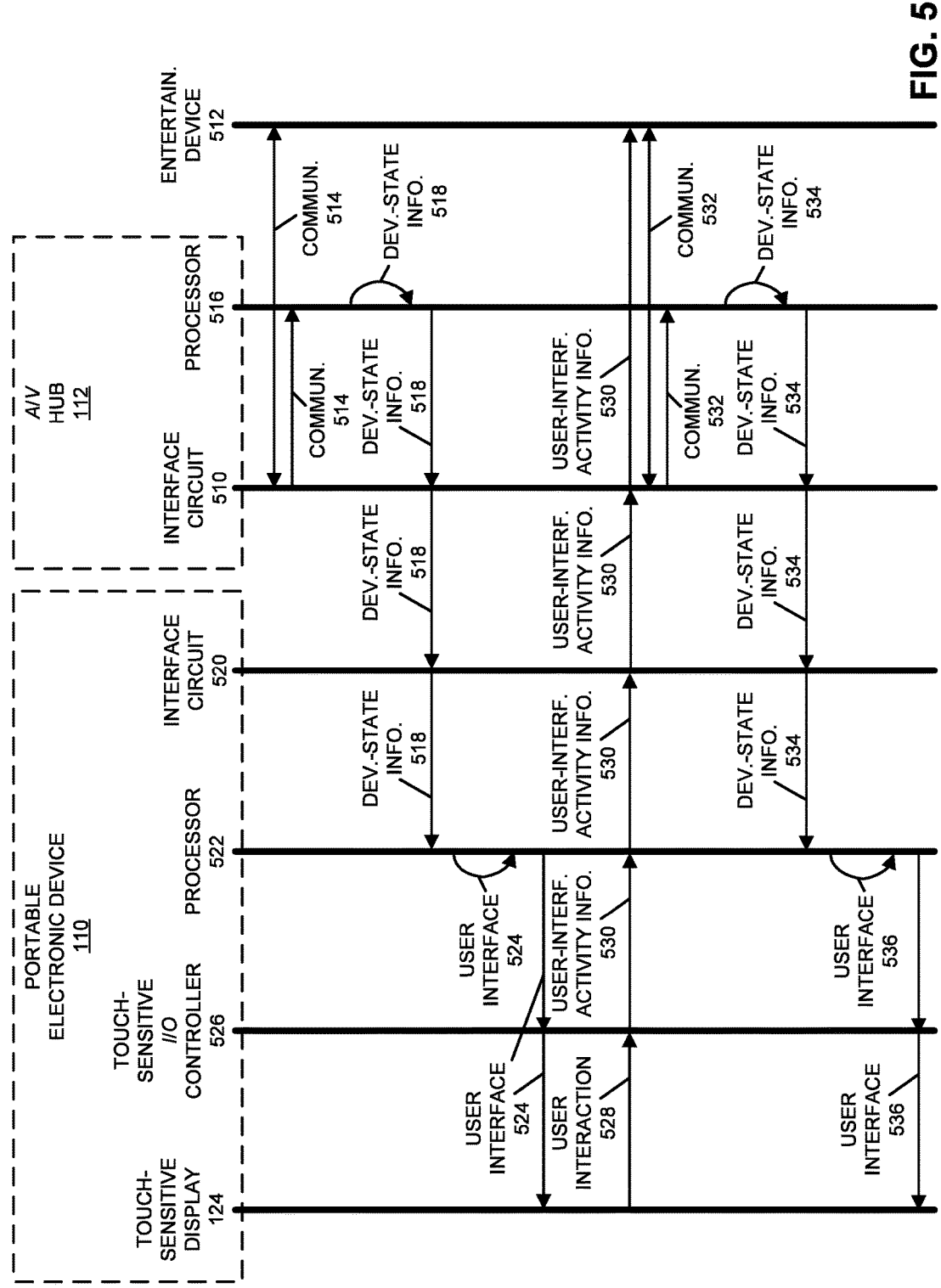
FIG. 5 is a drawing illustrating communication among the electronic devices in FIG. 1 in accordance with an embodiment of the present disclosure.

Embodiments of the feedback technique are further illustrated in FIG. 5, which presents a drawing illustrating communication between portable electronic device 110 and A/V hub 112. In particular, processor 516 in A/V hub 112 may determine device-state information 518, such as a current state of entertainment device 512. For example, A/V hub 112 may determine device-state information 518 based on packets or frames communicated 514 with entertainment device 512 via interface circuit 510. Then, processor 516 may instruct interface circuit 510 to wirelessly communicate device-state information 518 to portable electronic device 110. In addition, processor 516 may instruct interface circuit 510 to wirelessly communicate additional information to portable electronic device 110, such as: a type of entertainment device 512, a manufacturer of entertainment device 512, and/or context information specifying a context of A/V content displayed on entertainment device 512.

After interface circuit 520 in portable electronic device 110 receives device-state information 518, the type, the manufacturer, and/or the context information, processor 522 may generate user interface 524 (or instructions for objects or graphical information in user interface 524) based on: a state diagram of entertainment device 512 (which may be stored in memory in portable electronic device 110), device-state information 518, the type, the manufacturer, and/or the context information. For example, processor 522 may generate instructions for the objects or graphical information that includes or specifies user interface 524, including display-specific information, such as: a location where the graphical information is to be displayed on touch-sensitive display 124 (TSD 124) having a particular type, display size, and/or an aspect ratio or geometry, e.g., an aspect ratio of 5:4 or 4:3 with a display diagonal of at least 3.5 or 5 in. (These values are for purposes of illustration only, and a wide variety of display sizes, aspect ratios and types may be used in touch-sensitive display 124.) Furthermore, generating user interface 524 may involve calculating a two or three-dimensional model and/or rendering operations, such as: two or three-dimensional projection, ray tracing, shading, coloring, texturing, illumination effects, texture mapping, and/or anti-aliasing. In the case of a three-dimensional touch-sensitive display 124, the rendering operations may include calculating one or more images that include or represent: image parallax, motion parallax (based on motion of the user relative to touch-sensitive display 124) and/or prehension (which may allow the user to perceive three-dimensional tactile or haptic interaction with objects).

Then, processor 522 may display user interface 524 on touch-sensitive display 124 via touch-screen I/O controller 526.

Subsequently, while a user is using portable electronic device 110, touch-screen I/O controller 526 may provide user-interface activity information 530 to processor 522 based on user interaction 528 with touch-sensitive display 124, such as: the user making or breaking contact with a surface of touch-sensitive display 124, moving a touch contact point on the surface, etc. Then, processor 522 may instruct interface circuit 520 to communicate user-interface activity information 530 to A/V hub 112.

After interface circuit 510 in A/V hub 112 receives user-interface activity information 530, interface circuit 510 may communicate user-interface activity information 530 to entertainment device 512. Then, A/V hub 112 may determine device-state information 534 based on packets or frames communicated 532 with entertainment device 512 via interface circuit 510. Next, processor 516 may instruct interface circuit 510 to wirelessly communicate device-state information 534 to portable electronic device 110.

Furthermore, after interface circuit 520 in portable electronic device 110 receives device-state information 534, processor 522 may generate user interface 536 (or instructions for objects or graphical information in user interface 536) based on: the state diagram of entertainment device 512, device-state information 536, the type, the manufacturer, and/or the context information. Next, processor 522 may display user interface 536 on touch-sensitive display 124 via touch-screen I/O controller 526. In this way, portable electronic device 110 and A/V hub 112 may dynamically adapt the user interface as the current state of entertainment device 512 changes.

Alternatively or additionally, as noted previously, user-interface information that specifies the user interface may be generated by the A/V hub. FIG. 6 presents embodiments of a flow diagram illustrating method 600 for providing a user interface, which may be performed by an A/V hub, such as A/V hub 112 (FIG. 1). During operation, the A/V hub determines, via a processor in the A/V hub, device-state information (operation 610), wherein the device-state information specifies a current state of an entertainment device. Then, the A/V hub generates, based on the determined device-state information, user-interface information that specifies a user interface (operation 612) that includes one or more virtual command icons associated with the current state and one or more related states of the entertainment device that are related to the current state in a state diagram by corresponding operations that transition the entertainment device from the current state to the one or more related states. Next, the A/V hub provides the user-interface information (operation 614) to a portable electronic device for display on a touch-sensitive display in the portable electronic device.

Note that the A/V hub may optionally generate the user-interface information based on: a type of the entertainment device, a manufacturer of the entertainment device, and/or context information that specifies a context of A/V content displayed on the entertainment device. Thus, in these embodiments, the one or more virtual command icons and/or their locations in the user interface may be based on: the type of the entertainment device, the manufacturer of the entertainment device, and/or the context.

Moreover, the A/V hub may optionally receive, via the interface circuit, user-interface activity information (operation 616) specifying activation of a virtual command icon in the one or more virtual command icons, where the activation of the virtual command icon specifies a transition of the entertainment device from the current state to a new current state in the state diagram. For example, the activation of the virtual command icon may involve a user of the portable electronic device contacting the touch-sensitive display within a strike area of the virtual command icon and then releasing the contact. In response to receiving the user-interface activity information, the A/V hub may optionally: modify the user-interface information (operation 618) to change the one or more virtual command icons based on the new current state; and provide, via the interface circuit, the modified user-interface information (operation 620) for display on the touch-sensitive display in the portable electronic device.

Figure 7:
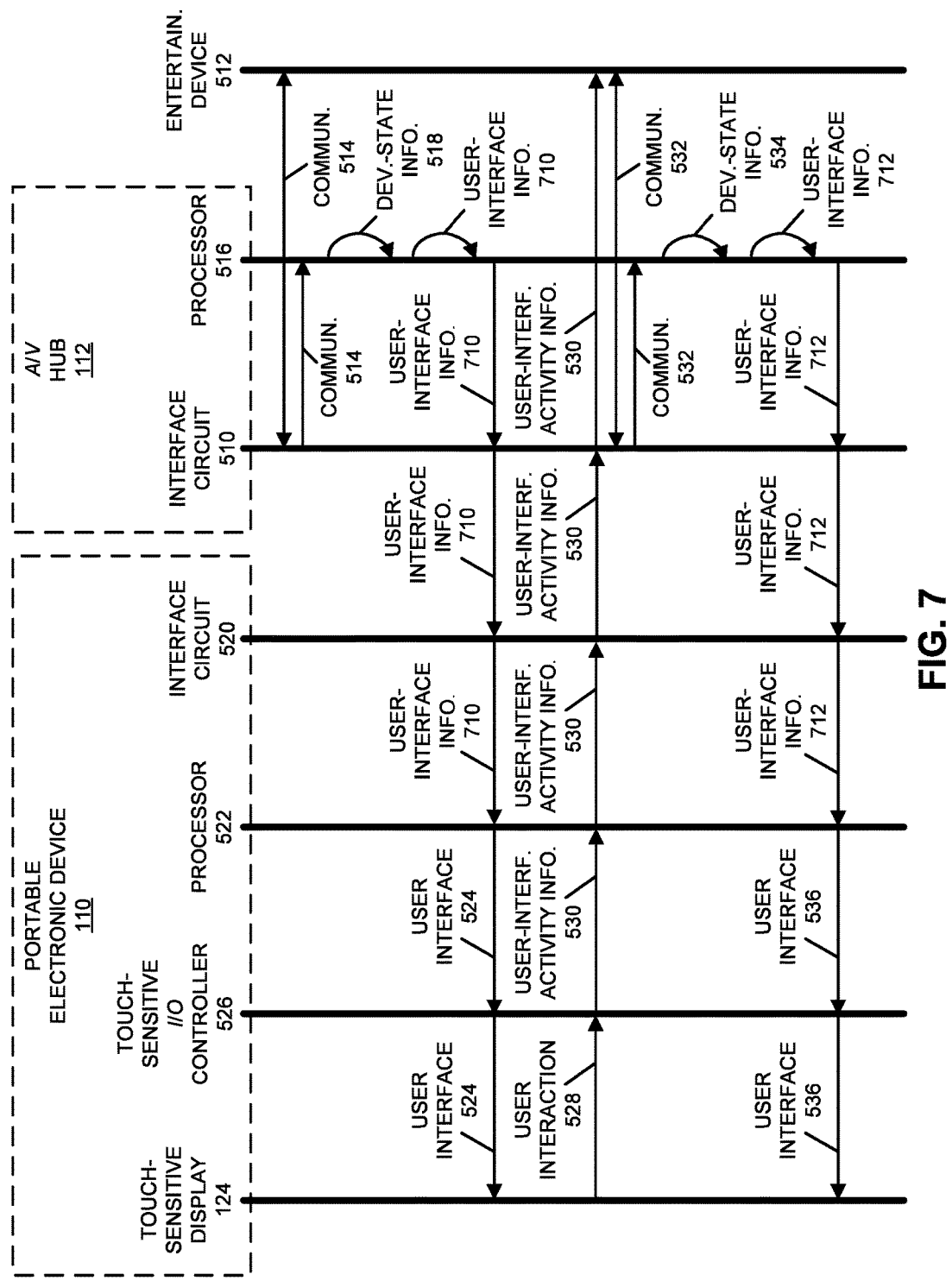
FIG. 7 is a drawing illustrating communication among the electronic devices in FIG. 1 in accordance with an embodiment of the present disclosure.

Embodiments of the feedback technique are further illustrated in FIG. 7, which presents a drawing illustrating communication between portable electronic device 110 and A/V hub 112. In particular, processor 516 in A/V hub 112 may determine device-state information 518, such as a current state of entertainment device 512. For example, A/V hub 112 may determine device-state information 518 based on packets or frames communicated 514 with entertainment device 512 via interface circuit 510.

Then, processor 516 may generate user-interface information 710 that specifies user interface 524 (or instructions for objects or graphical information in user interface 524) based on: a state diagram of entertainment device 512, device-state information 518, a type of entertainment device 512, a manufacturer of entertainment device 512, and/or context information. For example, processor 516 may generate instructions for the objects or graphical information that includes or specifies user interface 524, including display-specific information, such as: a location where the graphical information is to be displayed on touch-sensitive display 124 (TSD 124) having a particular type, display size, and/or an aspect ratio or geometry, e.g., an aspect ratio of 5:4 or 4:3, with a display diagonal of at least 3.5 or 5 in. (These values are for purposes of illustration only, and a wide variety of display sizes, aspect ratios and types may be used in touch-sensitive display 124.) Furthermore, generating user-interface information 710 may involve calculating a two or three-dimensional model and/or rendering operations, such as: two or three-dimensional projection, ray tracing, shading, coloring, texturing, illumination effects, texture mapping, and/or anti-aliasing. In the case of a three-dimensional touch-sensitive display 124, the rendering operations may include calculating one or more images that include or represent: image parallax, motion parallax (based on motion of the user relative to touch-sensitive display 124) and/or prehension (which may allow the user to perceive three-dimensional tactile or haptic interaction with objects).

Then, processor 516 may provide user-interface information 710 to portable electronic device 110. After user interface 520 receives user-interface information 710, processor 522 may display user interface 524 on touch-sensitive display 124 via touch-screen I/O controller 526.

Subsequently, while a user is using portable electronic device 110, touch-screen I/O controller 526 may provide user-interface activity information 530 to processor 522 based on user interaction 528 with touch-sensitive display 124, such as: the user making or breaking contact with a surface of touch-sensitive display 124, moving a touch contact point on the surface, etc. Then, processor 522 may instruct interface circuit 520 to communicate user-interface activity information 530 to A/V hub 112.

After interface circuit 510 in A/V hub 112 receives user-interface activity information 530, interface circuit 510 may communicate user-interface activity information 530 to entertainment device 512. Then, A/V hub 112 may determine device-state information 534 based on packets or frames communicated 532 with entertainment device 512 via interface circuit 510. Next, processor 516 may generate user-interface information 712 that specifies user interface 536 (or instructions for objects or graphical information in user interface 536) based on: the state diagram of entertainment device 512, device-state information 534, the type, the manufacturer, and/or the context information.

Furthermore, processor 516 may instruct interface circuit 510 to wirelessly communicate user-interface information 712 to portable electronic device 110. After interface circuit 520 in portable electronic device 110 receives user-interface information 712, processor 522 may display user interface 536 on touch-sensitive display 124 via touch-screen I/O controller 526. In this way, portable electronic device 110 and A/V hub 112 may dynamically adapt the user interface as the current state of entertainment device 512 changes.

Figure 8:
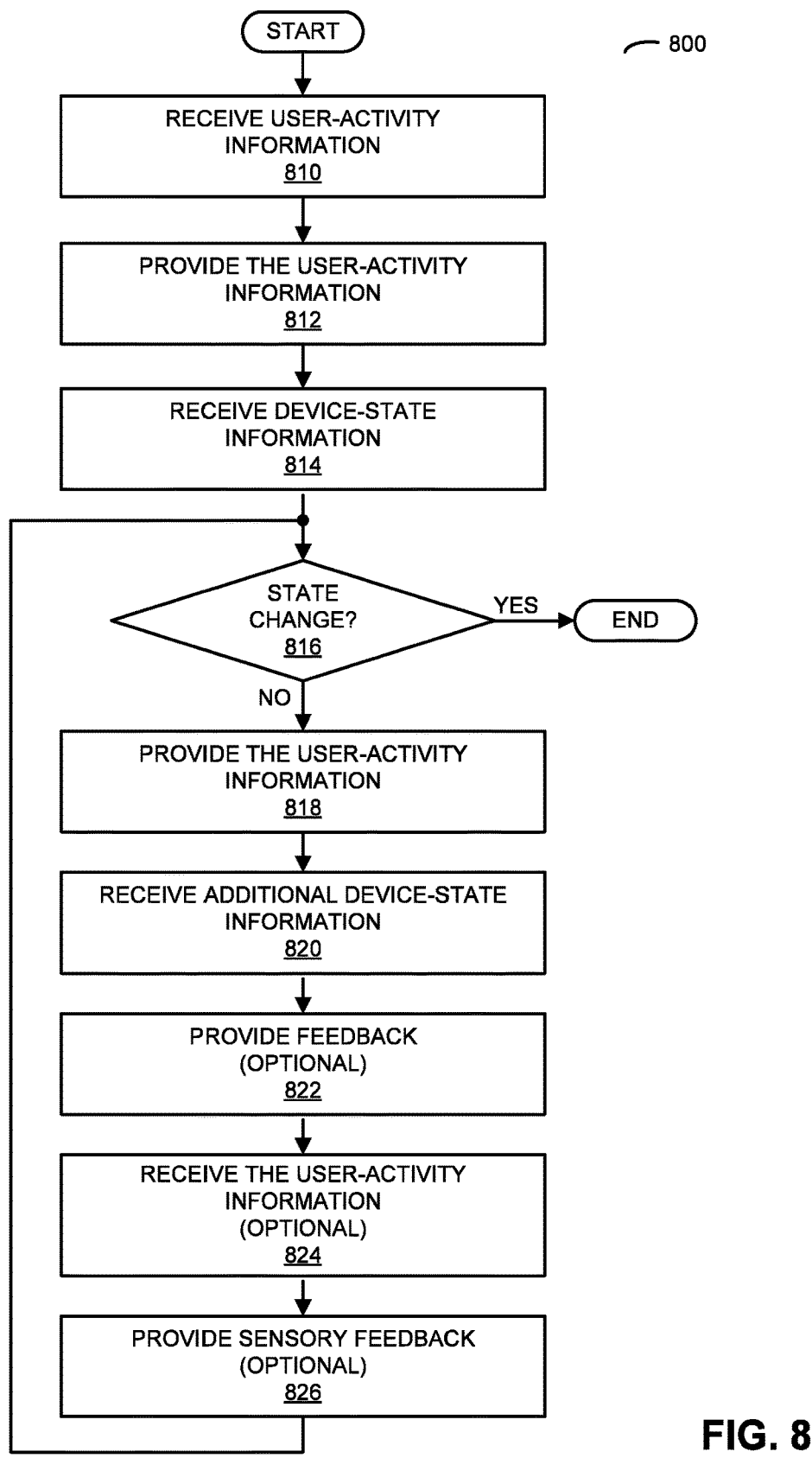
FIG. 8 is a flow diagram illustrating a method for communicating a change in a state of an entertainment device in accordance with an embodiment of the present disclosure.
Figure 9:
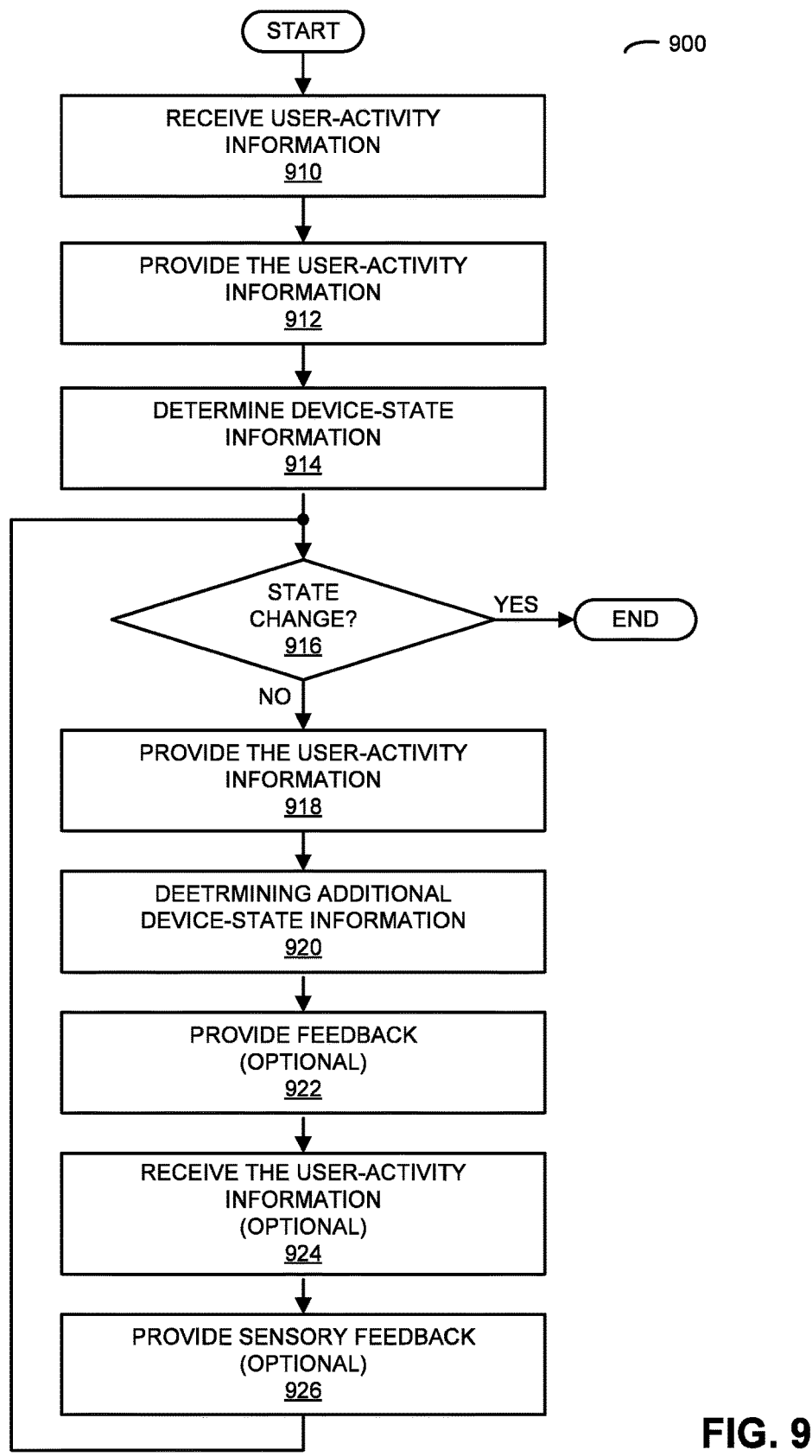
FIG. 9 is a flow diagram illustrating a method for communicating a change in a state of an entertainment device in accordance with an embodiment of the present disclosure.

FIG. 8 presents a flow diagram illustrating a method 800 for communicating a change in a state of an entertainment device, which may be performed by a portable electronic device, such as portable electronic device 110 (FIG. 1). During operation, the portable electronic device (such as a cellular telephone or a remote control) receives user-interface activity information (operation 810) specifying activation of a virtual command icon in a user interface displayed on a touch-sensitive display in the portable electronic device, where the activation of the virtual command icon specifies the change in the state of an entertainment device (such as an A/V display device, e.g., a television). Then, the portable electronic device provides, via an interface circuit in the portable electronic device, the user-interface activity information (operation 812) to the A/V hub. Moreover, the portable electronic device receives, via the interface circuit, device-state information (operation 814) from the A/V hub indicating whether the change in the state of the entertainment device has occurred. Next, when the change in the state of the entertainment device has not occurred (operation 816), the portable electronic device performs, until the change in the state of the entertainment device has occurred, operations of: providing, via the interface circuit, the user-interface activity information (operation 818) to the A/V hub; and receiving, via the interface circuit, additional device-state information (operation 820) from the A/V hub indicating whether the change in the state of the entertainment device has occurred.

Note that, when the change in the state of the entertainment device has not occurred (operation 816), the portable electronic device may optionally provide, until the change in the state of the entertainment device has occurred, feedback (operation 822) that indicates that the change in the state of the entertainment device is being implemented. For example, providing the feedback (operation 822) may involve displaying a visual indicator in the user interface on the touch-sensitive display that indicates that the change in the state of the entertainment device is being implemented. Alternatively or additionally, providing the feedback (operation 822) may involve providing, to the A/V hub, instructions for the visual indicator that indicates that the change in the state of the entertainment device is being implemented, where the visual indicator is to be displayed on the entertainment device.

Furthermore, when the portable electronic device optionally receives the user-interface activity information again (operation 824), such as when the user activates the virtual command icon in the user interface again, the portable electronic device may optionally provide sensory feedback (operation 826) that indicates that the change in the state of the entertainment device is being implemented. For example, the portable electronic device may include a vibration actuator coupled to the control circuit, and providing the sensory feedback may involve activating the vibration actuator. However, in other embodiments another type of sensory feedback (such as a flashing light and/or sound) is provided.

Alternatively or additionally to method 800, in some embodiments operations in the feedback technique are performed, at least in part, by A/V hub 112 (FIG. 1). This is shown in FIG. 9, which presents a flow diagram illustrating a method 900 for communicating a change in a state of an entertainment device, which may be performed by an A/V hub, such as A/V hub 112 (FIG. 1). During operation, the A/V hub receives, via an interface circuit, the user-interface activity information (operation 910) from the portable electronic device specifying the activation of the virtual command icon in the user interface displayed on the portable electronic device, where the activation of the virtual command icon specifies the change in the state of an entertainment device. Then, the A/V hub provides the user-interface activity information (operation 912) to the entertainment device. Moreover, the A/V hub determines the device-state information (operation 914) about the entertainment device indicating whether the change in the state of the entertainment device has occurred. Next, when the change in the state of the entertainment device has not occurred (operation 916), the A/V hub performs, until the change in the state of the entertainment device has occurred, operations of: providing the user-interface activity information (operation 918) to the entertainment device; and determining additional device-state information (operation 920) about the entertainment device indicating whether the change in the state of the entertainment device has occurred.

Note that, when the change in the state of the entertainment device has not occurred (operation 916), the A/V hub may optionally provide, until the change in the state of the entertainment device has occurred, feedback (operation 922) that indicates that the change in the state of the entertainment device is being implemented. For example, providing the feedback (operation 922) may involve providing, via an interface circuit in the A/V hub, a visual indicator to the portable electronic device for display in the user interface to indicate that the change in the state of the entertainment device is being implemented. Alternatively or additionally, providing the feedback (operation 922) may involve providing, to the entertainment device, the visual indicator for display on the entertainment device, where the visual indicator indicates that the change in the state of the entertainment device is being implemented.

Furthermore, when the A/V hub optionally receives the user-interface activity information again (operation 924) from the portable electronic device (such as when the user activates the virtual command icon in the user interface again), the A/V hub may provide, via the interface circuit, a sensory-feedback instruction (operation 926) to the portable electronic device that, when performed by the portable electronic device, indicates that the change in the state of the entertainment device is being implemented. For example, the sensory-feedback instruction may instruct the portable electronic device to activate the vibration actuator. However, in other embodiments another type of sensory feedback (such as a flashing light or sound) is provided.

Figure 10:
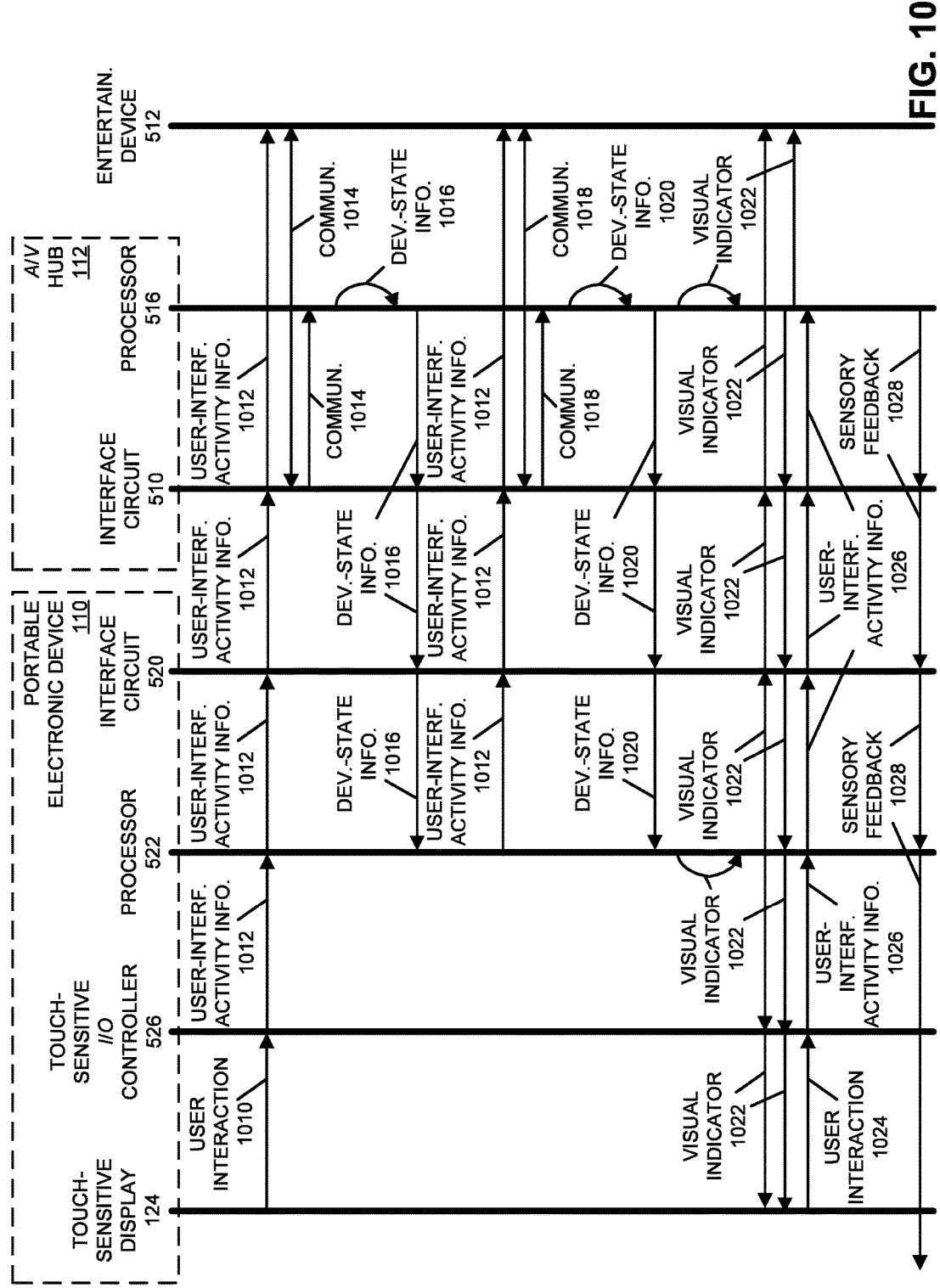
FIG. 10 is a drawing illustrating communication among the electronic devices in FIG. 1 in accordance with an embodiment of the present disclosure.

FIG. 10 presents a drawing illustrating communication among the electronic devices in FIG. 1, which presents a drawing illustrating communication between portable electronic device 110, A/V hub 112 and entertainment device 910. In particular, while a user is using portable electronic device 110, touch-screen I/O controller 526 may provide user-interface activity information 1012 to processor 522 based on user interaction 1010 with touch-sensitive display (TSD 124), such as the user making or breaking contact with a surface of touch-sensitive display 124 (i.e., specifying activation of the virtual command icon in the user interface that specifies the change in the state of the entertainment device). Then, processor 520 may instruct interface circuit 520 to communicate user-interface activity information 1012 to A/V hub 112.

After interface circuit 510 in A/V hub 112 receives user-interface activity information 1012, interface circuit 510 may provide user-interface activity information 1012 to entertainment device 512 (such as A/V display device 114 or one of consumer-electronic devices 116 in FIG. 1). Then, processor 516 may determine device-state information 1016 indicating whether the change in the state of entertainment device 512 has occurred based on subsequent communication 1014 between A/V hub 112 and entertainment device 512.

In some embodiments, processor 516 optionally instructs interface circuit 510 to provide device-state information 1016 to portable electronic device 110. After interface circuit 520 optionally receives device-state information 1016, if the change in the state of entertainment device 512 has not occurred, processor 1022 may optionally perform, until the change in the state of entertainment device 512 has occurred, operations of: providing, via interface circuit 520, user-interface activity information 1012 to A/V hub 112; and receiving, via interface circuit 520, additional device-state information 1020 from A/V hub 112 indicating whether the change in the state of the entertainment device has occurred. Similarly, when the change in the state of entertainment device 512 has not occurred, processor 516 may optionally perform, until the change in the state of entertainment device 512 has occurred, operations of: providing, via interface circuit 510, user-interface activity information 1012 to entertainment device 512; and determining additional device-state information 1020 about entertainment device 512 indicating whether the change in the state of entertainment device 512 has occurred (based on communication 1018 between A/V hub 112 and entertainment device 512). Note that A/V hub 112 may only provide the user-interface activity information differentially, so that entertainment device 512 may only receive a change to the user-interface activity information once.

However, because the communication between portable electronic device 110 and A/V hub 112 is bidirectional, the situational awareness about the state of entertainment device 512 can be used to keep the user informed about the status of the user's instruction to change the state of entertainment device 512 and to prevent the user from becoming frustrated.

In particular, portable electronic device 110 and/or A/V hub 112 may provide feedback to the user about the status of the change in the state of entertainment device 512.

For example, when the change in the state of entertainment device 512 has not occurred, processor 522 may optionally provide, until the change in the state of entertainment device 512 has occurred, feedback that indicates that the change in the state of entertainment device 512 is being implemented. In particular, processor 522 may optionally generate visual indicator 1022 (such as instructions for graphical information or an object that indicates that the change in the state of entertainment device 512 is being implemented), which is provided to touch-screen I/O controller 526 and then displayed on TSD 124. Alternatively or additionally, processor 522 may optionally instruct interface circuit 520 to provide visual indicator 1022 to A/V hub 112. This visual indicator may be received by interface circuit 510 and forwarded to entertainment device 510 (or an A/V display device) for display to the user. Note that if touch-screen I/O controller 526 subsequently provides user-interface activity information 1026 to processor 522 based on user interaction 1024 with TSD 124 (such as when the user activates the virtual command icon in the user interface again), processor 522 may optionally provide an instruction for sensory feedback 1028 to a sensory-feedback mechanism (not shown) (such as a light, a speaker and/or an eccentric-rotating-mass actuator or a linear-resonant actuator) that indicates the change in the state of entertainment device 512 is being implemented (so that the user does not continue to activate the virtual command icon in frustration). Alternatively or additionally, processor 522 may optionally instruct interface circuit 520 to provide user-interface activity information 1026 to A/V hub 112.

Similarly, when the change in the state of entertainment device 512 has not occurred, processor 516 may optionally provide, until the change in the state of entertainment device 512 has occurred, feedback that indicates that the change in the state of entertainment device 512 is being implemented. For example, processor 512 may optionally generate visual indicator 1022 (such as the instructions for the graphical information or the object that indicates that the change in the state of entertainment device 512 is being implemented), which is optionally provided, via interface circuit 510, to portable electronic device 110 for display on TSD 124 and/or to entertainment device 512 for display to the user. Note that if interface circuit 510 subsequently receives user-interface activity information 1026, processor 516 may optionally the instruction for sensory feedback 1028 to portable electronic device 110. This instruction for sensory feedback 1028 may optionally be performed by the sensory-feedback mechanism (not shown).

Note that generating visual indicator 1022 (or instructions for visual indicator 1022) based on user-interface activity information 1012 or 1026 and/or device-state information 1016 or 1020 may involve generating instructions for an object or graphical information that includes or specifies visual feedback, such as a partially transparent graphical overlay that can be displayed on portable electronic device 110 and/or A/V display device 114. The graphical information may include display-specific information, such as: a location where the graphical information is to be displayed on a display having a particular type, display size, and/or an aspect ratio or geometry, e.g., an aspect ratio of 5:4 or 4:3 with a display diagonal of at least 3.5 or 5 in., or an aspect ratio of 16:9 with a display diagonal of at least 50 in. (These values are for purposes of illustration only, and a wide variety of display sizes, aspect ratios and types may be used in portable electronic device 110 and/or A/V display device 114.) Furthermore, generating visual indicator 1022 may involve calculating a two or three-dimensional model (such as a model of the virtual icons in the user interface, which may be based on the state diagram) and/or rendering operations, such as: two or three-dimensional projection, ray tracing, shading, coloring, texturing, illumination effects, texture mapping, and/or anti-aliasing. In the case of a three-dimensional display in A/V display device 114, the rendering operations may include calculating one or more images that include or represent: image parallax, motion parallax (based on motion of the user relative to A/V display device 114) and/or prehension (which may allow the user to perceive three-dimensional tactile or haptic interaction with objects). For example, visual indicator 1022 may include graphical information, such as: flashing a representation of the virtual command icon, changing a line thickness in the virtual command icon and/or adding a graphical symbol (such as an hour glass or a watch face). When displayed on A/V display device 114, visual indicator 1022 may include a graphical representation of the user interface, including locations or a layout of one or more virtual command icons.

In this way, the feedback technique may leverage knowledge of the device-state information to keep the user information about the status of their instruction to change the state of the entertainment device. In the process, the feedback technique may reduce user frustration, and thus may improve user satisfaction when using the portable electronic device, the A/V hub and/or the entertainment device.

Consequently, methods 200 (FIG. 2), 400 (FIG. 4), 600 (FIG. 6) 800 (FIG. 8) and/or 900 (FIG. 9) may reduce user errors or mistakes when using the user interface, which may improve the user experience when using the portable electronic device and/or the A/V hub.

In some embodiments of methods 200 (FIG. 2), 400 (FIG. 4), 600 (FIG. 6) 800 (FIG. 8) and/or 900 (FIG. 9), there may be additional or fewer operations. For example, in a more general version of method 200 (FIG. 2), when the entertainment device is electrically coupled to the input connector, the state-detection circuit may determine a state of the entertainment device and/or an identify the entertainment device. Moreover, the order of the operations may be changed, and/or two or more operations may be combined into a single operation.

As noted previously, the device-state information (such as whether an entertainment device is: electrically coupled to A/V hub 112 in FIG. 1, in a power-on state, in a power-off state, and/or another state, e.g., a playback state, a pause state, a stop state, etc.) may be determined using hardware (such as a state-detection circuit) and/or software (which may be executed by a processor and, more generally, a control circuit). FIG. 11 presents a block diagram illustrating a state-detection circuit 1110 in A/V hub 112 (FIG. 1). In A/V hub 112 (FIG. 1), input connector 1112 (which may be compatible with an HDMI standard) may be electrically coupled to an entertainment device. State-detection circuit 1110 may be coupled to at least pin 1114 in input connector 1112, so that, when the entertainment device is electrically coupled to input connector 1112, state-detection circuit 1110 establishes a ground loop between A/V hub 112 (FIG. 1) and the entertainment device. For example, pin 1114 may include a transition minimized differential signaling (TMDS) data1 shield. (Alternatively, pin 1114 may include a TMDS data1 shield.) Moreover, state-detection circuit 1110 may include: an energy-dissipation component (such as resistor 1116) electrically coupled to a power-supply voltage and pin 1114 (which may provide electrostatic-discharge protection); an energy-storage component (such as capacitor 1118) electrically coupled to pin 1114 and ground; and a bi-directional voltage clamp (such as varistor 1120 or a Verner diode), in parallel with capacitor 1118, electrically coupled to pin 1114 and ground. For example, resistor 1116 may be 150 kΩ and capacitor 1118 may be 0.047 g. In some embodiments, state-detection circuit 1110 includes a general-purpose input/output (GPIO) device 1126 coupled to pin 1114. The behavior (such as an input pin, an output pin, enabled or disabled) of GPIO device 1126 may be controlled using control signals or instructions from control logic 1124.

Figure 11:
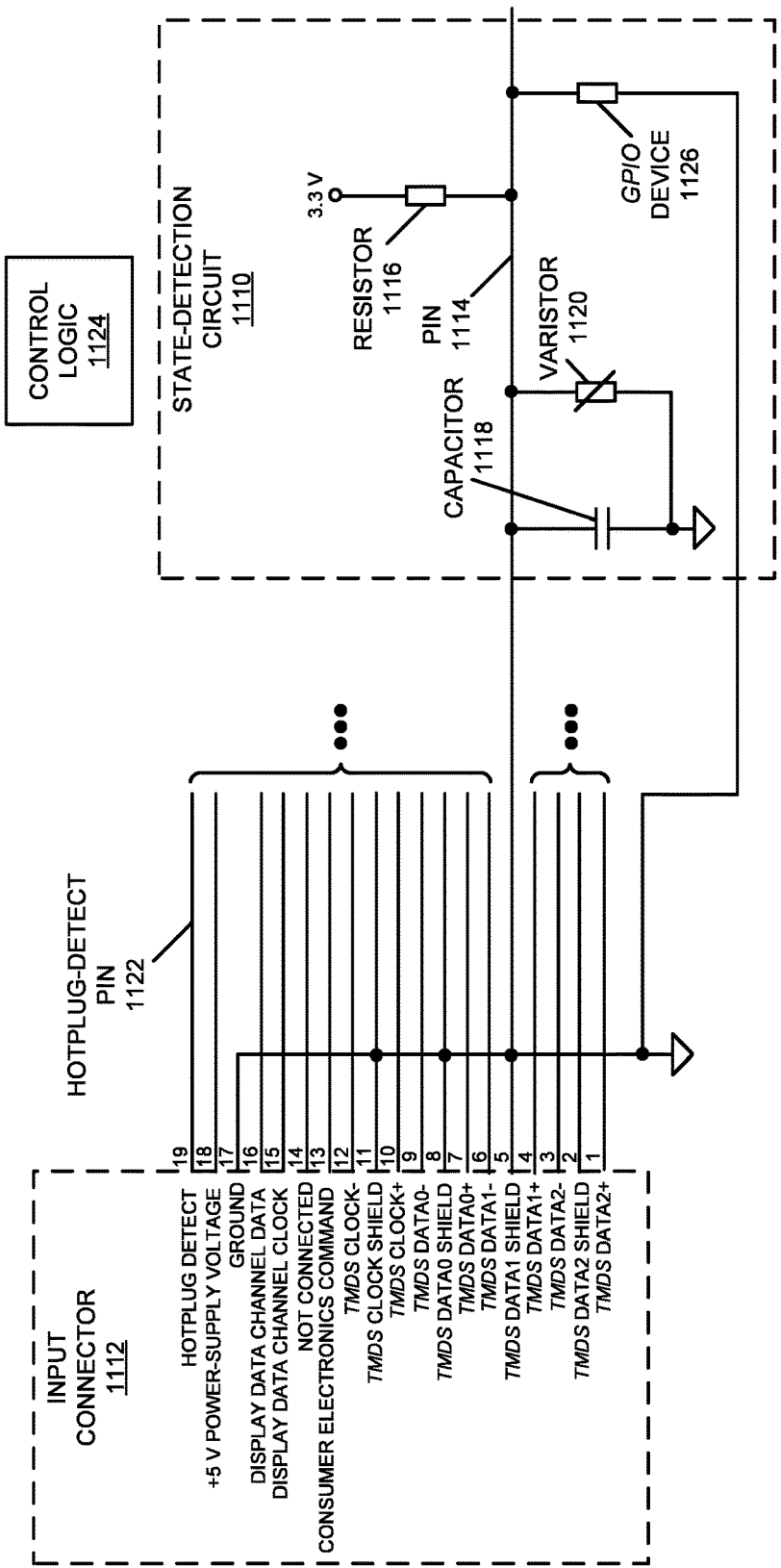
FIG. 11 is a block diagram illustrating a state-detection circuit in one of the electronic devices of FIG. 1 in accordance with an embodiment of the present disclosure.
Figure 12:
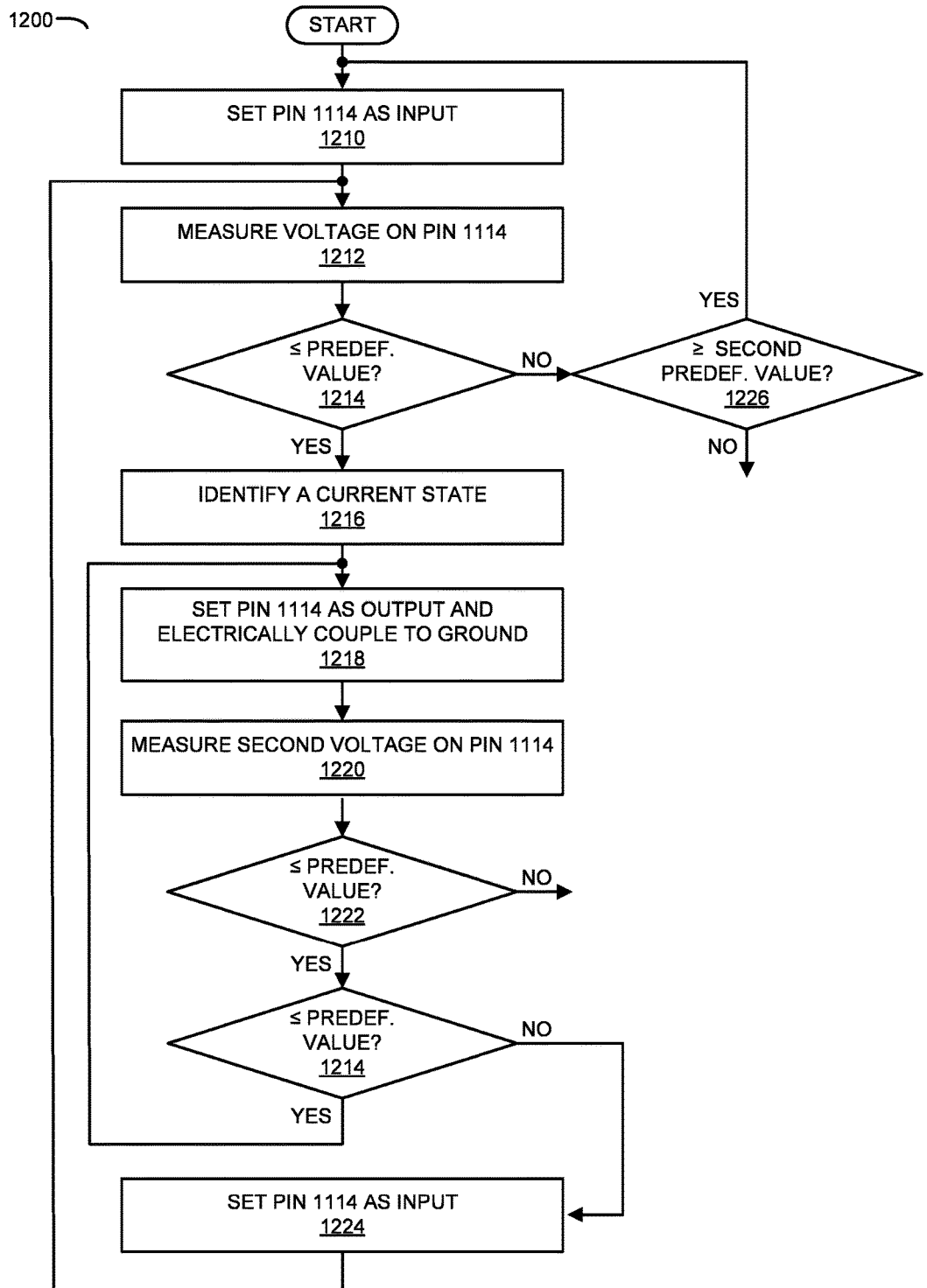
FIG. 12 is a flow diagram illustrating a method for detecting an entertainment device in accordance with an embodiment of the present disclosure.

FIG. 12 presents a flow diagram illustrating a method 1200 for detecting an entertainment device, which may be performed by an A/V hub (such as A/V hub 112 in FIG. 1) using state-detection circuit 1110 in FIG. 11. During operation, a control circuit (such as a processor and/or control logic 1124, which may be included in or external to state-detection circuit 1110) in A/V hub 112 (FIG. 1), which is electrically coupled to input connector 1112, detects whether there is electrical coupling between the entertainment device and input connector 1112 using state-detection circuit 1110 (FIG. 11). In particular, detecting whether there is electrical coupling between the entertainment device and input connector 1112 may involve: setting pin 1114 as an input (operation 1210), where pin 1114 is then pulled to a power-supply voltage by control logic 1124; measuring a voltage on pin 1114 (operation 1212) using control logic 1124; and detecting the electrical coupling between the entertainment device and input connector 1112 when the voltage on pin 1114 is less than or equal to a predefined value (operation 1214), such as when the voltage is approximately ground, using control logic 1124. Note that, when the electrical coupling between the entertainment device and input connector 1112 is detected, control logic 1124 may: set pin 1114 as an output and electrically couple pin 1114 to ground (operation 1218), which may improve signal integrity; and measure a second voltage (operation 1220) on hotplug-detect pin 1122 in input connector 1112. When the second voltage on hotplug-detect pin 1122 is less than or equal to the predefined value (operation 1222), control logic 1124 may set pin 1114 as an input (operation 1224) and repeat the measurement of the voltage on pin 1114 (operation 1212). Alternatively, when the voltage equals or exceeds a second predefined value (operation 1226), such as when the voltage is approximately the power-supply voltage, control logic 1124 may repeat detecting whether there is electrical coupling between the entertainment device and input connector 1112. Furthermore, when the voltage is less than or equal to the predefined value (operation 1214), control logic 1124 may identify a current state (operation 1216) of the entertainment device, such as: a power-off state, and a standby state. For example, control logic 1124 may provide the set of first control commands, provide the set of second control commands, and/or may monitor (via one or more pins in input connector 1112) content activity, such as a data stream to and/or from the entertainment device. Thus, control logic 1124 may determine that the entertainment device is: in the power-off state when there is no a data stream; in the standby state when the data stream has a low data rate; and in the playback state when the data stream has a data rate associated with A/V content and/or includes the A/V content. Note that, when the second voltage on hotplug-detect pin 1122 is less than or equal to the predefined value (operation 1222) and when the voltage is less than or equal to the predefined value (operation 1214), control logic 1124 may repeat setting pin 1114 as the output and electrically coupling pin 1114 to ground (operation 1218).

When the electrical coupling between the entertainment device and input connector 1112 is detected, control logic 1124 may optionally attempt to identify the entertainment device by providing consumer-electronics-control commands (which may be compatible with an HDMI standard) to the entertainment device. Alternatively or additionally (such as when the attempt is unsuccessful), control logic 1124 may provide a set of first control commands associated with different types of entertainment devices until, in response, content activity (such as packets or frames associated with a data stream of content communicated to and/or from the entertainment device) is detected by control logic 1124 via input connector 1112. For example, the set of first commands may include: a play command for the different types of entertainment devices; and/or a trick-mode command (such as fast forward, reverse, fast reverse, or skip) for the different types of entertainment devices. Moreover, when the content activity is detected, control logic 1124 may provide a set of second control commands associated with different providers of entertainment devices until a change in a state of the entertainment device is detected by control logic 1124 via input connector 1112 and state-detection circuit 1110. The set of second control commands may include: power-on control commands for the different providers of entertainment devices; and/or power-off control commands for the different providers of entertainment devices.

Alternatively or additionally, during operation control logic 1124 may detect whether there is electrical coupling between the entertainment device and input connector 1112 using state-detection circuit 1110 (FIG. 11). When the electrical coupling between the entertainment device and input connector 1112 is detected, control logic 1124 may: set pin 1114 as an output and electrically couple pin 1114 to ground; and measure the second voltage on hotplug-detect pin 1122 in input connector 1112. When the second voltage on hotplug-detect pin 1122 is less than or equal to the predefined value, control logic 1124 may set pin 1114 as an input and measure a voltage on pin 1114. Moreover, when the voltage equals or exceeds the second predefined value, control logic 1124 may repeat detecting whether there is electrical coupling between the entertainment device and input connector 1112. Furthermore, when the voltage is less than or equal to the predefined value, control logic 1124 may identify the current state of the entertainment device. In some embodiments, control logic 1124: provides a control command to the entertainment device; and identifies an additional state of the entertainment device based on content (such as A/V content) that is provided and/or received by the entertainment device in response to the control command. For example, the control command may include: a play command, and/or a trick-mode command (such as fast forward or fast skip, slow forward or slow skip, fast reverse, or slow reverse).

Figure 13:
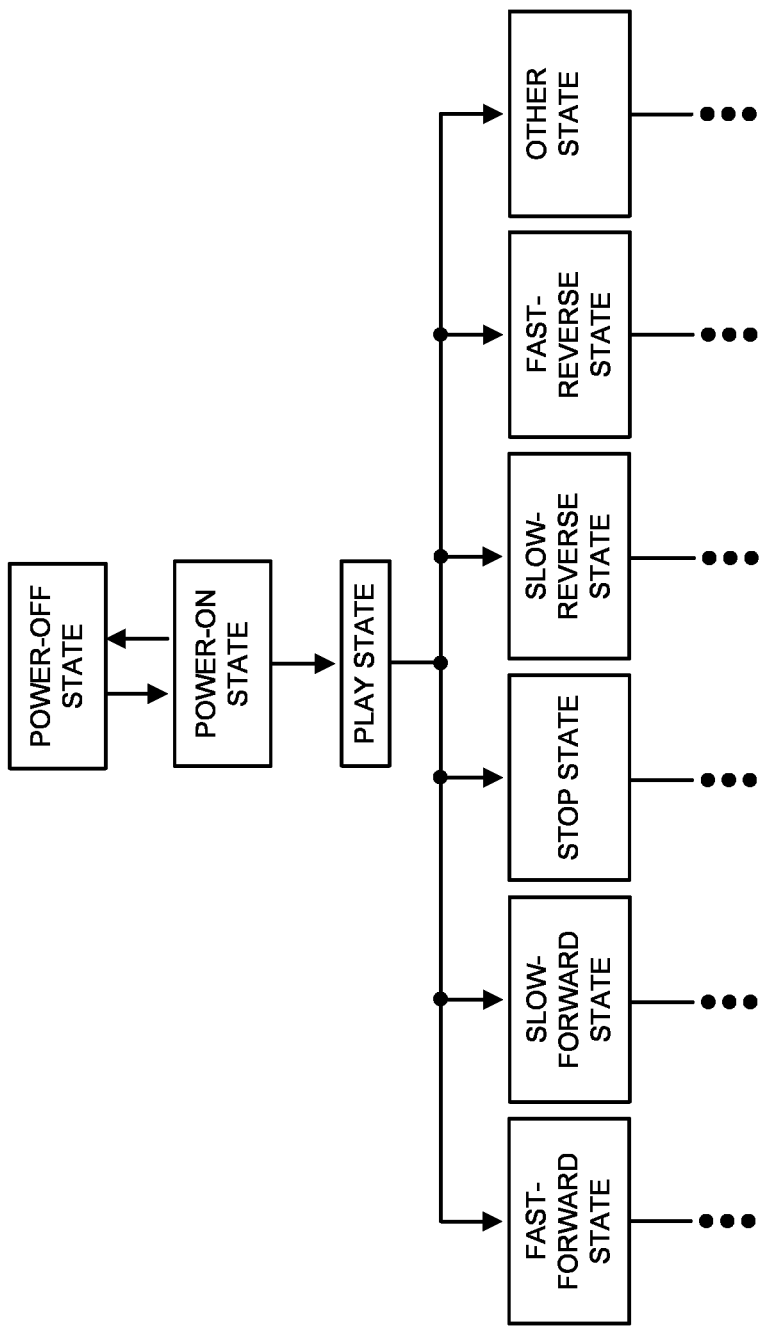
FIG. 13 is a drawing illustrating a state diagram for one of the electronic devices in FIG. 1 in accordance with an embodiment of the present disclosure.

FIG. 13 presents a drawing illustrating a state diagram 1300 of a given entertainment device in FIG. 1. This state diagram specifies the available commands in different menus for the given entertainment device that are relevant based on a current state of the given entertainment device. (Examples of the sets of commands in menus for different entertainment devices are shown in Table 1.) Thus, based on the device-state information, particular subsets of the available commands may be included or displayed in a user interface, such as a subset of the available commands that are relevant next states that can be accessed by the user (by activating a virtual command icon, e.g., by contacting a surface of a touch-sensitive display within a strike area associated with the virtual command icon, and then breaking contact with the surface of the touch-sensitive display) from the current state of the given entertainment device.

TABLE 1

| Device | Menu 1 Commands | Menu 2 Commands | Menu 3 Commands |
|---|---|---|---|
| Cable/DVR | Volume up/down | Record | Live TV |
|  | Mute | Numbers | Info |
|  | DVR | — | Input |
|  | Channel up/down | — | Menu |
|  | Guide | — | Zoom |
|  | Play/Pause | — | Exit |
|  | Fast forward/rewind | — | Help |
|  | Prev/last | — | Clear |
| Cable | Volume up/down | — | — |
|  | Mute | — | — |
|  | Guide | — | — |
|  | Channel up/down | — | — |
|  | Record | — | — |
| DVR | Volume up/down | — | — |
|  | Mute | — | — |
|  | Play/Pause | — | — |
|  | Fast forward/rewind | — | — |
|  | Channel up/down | — | — |
| Streaming | Volume up/down | — | — |
|  | Mute | — | — |
|  | D-pad | — | — |
|  | Home | — | — |
|  | Play/Pause | — | — |
|  | Fast forward/rewind | — | — |
| DVD | Volume up/down | — | — |
|  | Mute | — | — |
|  | Play/Pause | — | — |
|  | Fast forward/rewind | — | — |
|  | Chapter skip/prev | — | — |
|  | Menu | — | — |
|  | D-Pad | — | — |
|  | Chapter select | — | — |
| Receiver | Volume up/down | — | — |
|  | Mute | — | — |
|  | Menu | — | — |
|  | D-pad | — | — |
| CD player/MP3 player dock | Volume up/down | — | — |
|  | Mute | — | — |
|  | Source | — | — |
|  | D-pad | — | — |
|  | Mute | — | — |
|  | Play | — | — |
|  | Guide | — | — |
| Gaming | Volume up/down | — | — |
|  | Mute | — | — |
|  | D-pad | — | — |
|  | Select | — | — |
|  | Back | — | — |
|  | Transport | — | — |
| TV | Volume up/down | — | — |
|  | Mute | — | — |
|  | D-pad | — | — |
|  | Channel up/down | — | — |
|  | Apps | — | — |
| User Online Content | Volume up/down | — | — |
|  | Mute | — | — |
|  | D-pad | — | — |
| Other | Volume up/down | — | — |
|  | Mute | — | — |
|  | D-pad | — | — |
|  | Channel up/down | — | — |
|  | Apps | — | — |
| Computer | Volume up/down | — | — |
|  | Mute | — | — |
|  | D-pad | — | — |
|  | Mouse | — | — |

Figure 14:
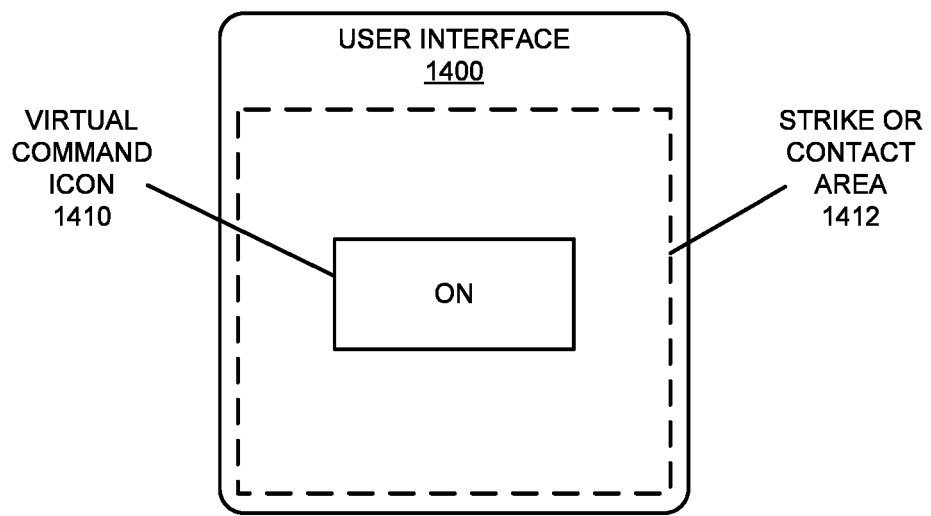
FIG. 14 is a drawing illustrating a user interface in accordance with an embodiment of the present disclosure.

For example, if the device-state information indicates that the device is in a power-off state, the user interface may initially only include one virtual command icon, which, when activated by a user, may power on the given entertainment device. This is shown in FIG. 14, which presents a drawing illustrating a user interface 1400 on a touch-sensitive display 124 in portable electronic device 110 in FIG. 1. In particular, user interface 1400 includes a virtual command icon 1410 corresponding to a power-on command. In this case, strike or contact area 1412 associated with virtual command icon 1410 may be much larger (e.g., as large as user interface 1400).

Figure 15:
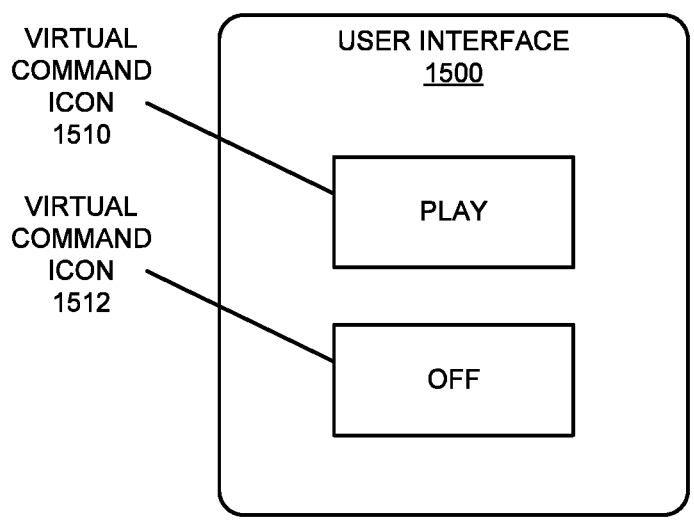
FIG. 15 is a drawing illustrating a user interface in accordance with an embodiment of the present disclosure.

After virtual command icon 1410 has been activated by the user, the user interface may include one or more virtual command icons that are associated with the current state and one or more related states of the entertainment device that are related to the current state in a state diagram by corresponding operations that transition the entertainment device from the current state to the one or more related states. Furthermore, the user interface may exclude one or more additional virtual command icons associated with one or more unrelated states of the entertainment device that are unrelated to the current state by direct transitions in the state diagram. Thus, as shown in FIG. 15, which presents a drawing illustrating a user interface 1500 on a touch-sensitive display 124 in portable electronic device 110 in FIG. 1, after the given entertainment device is powered on, user interface 1500 may include a virtual command icon 1510 corresponding to a play command and a virtual command icon 1512 that, when activated, powers off the given entertainment device. However, a virtual command icon corresponding to a stop command may not be displayed because it is not relevant to the current state of the entertainment device.

In some embodiments, a given operation directly transitions the given entertainment device from the current state to one of the additional states without passing through an intermediate state in the state diagram. These operations, and their associated states, may be the ones that are relevant at any given time for inclusion in the user interface.

While power-off and power-on were used as illustration of states of the given entertainment device, in other embodiments the current state includes one of a wide variety of states that are different than the power-off state or the power-on state.

Figure 16:
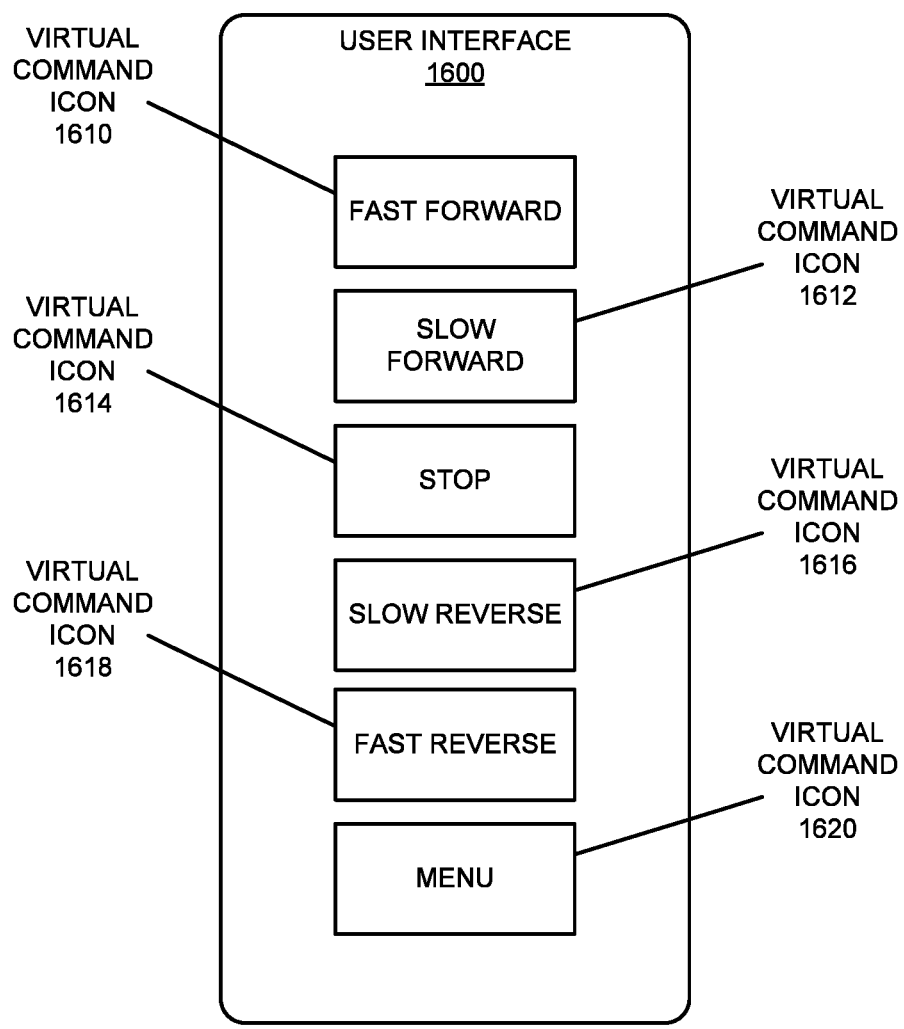
FIG. 16 is a drawing illustrating a user interface in accordance with an embodiment of the present disclosure.

For example, as shown in FIG. 16, which presents a drawing illustrating a user interface 1600 on a touch-sensitive display 124 in portable electronic device 110 in FIG. 1, after virtual command icon 1510 (FIG. 15) has been activated by the user, user interface 1600 may include: a virtual command icon 1610 corresponding to a fast-forward command, a virtual command icon 1612 corresponding to a slow-forward command, a virtual command icon 1614 corresponding to a stop command, a virtual command icon 1616 corresponding to a slow-reverse command, a virtual command icon 1618 corresponding to a fast-reverse command, and a virtual command icon 1620 corresponding to a main menu.

Figure 17:
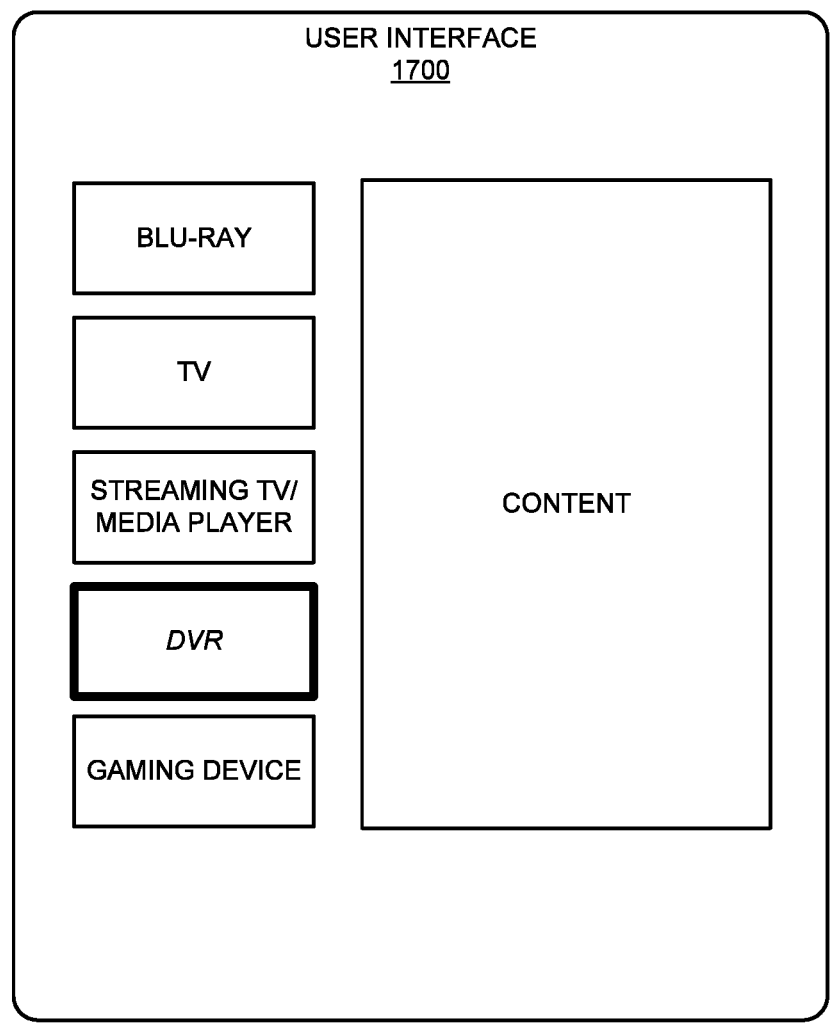
FIG. 17 is a drawing illustrating a user interface in accordance with an embodiment of the present disclosure.
Figure 18:
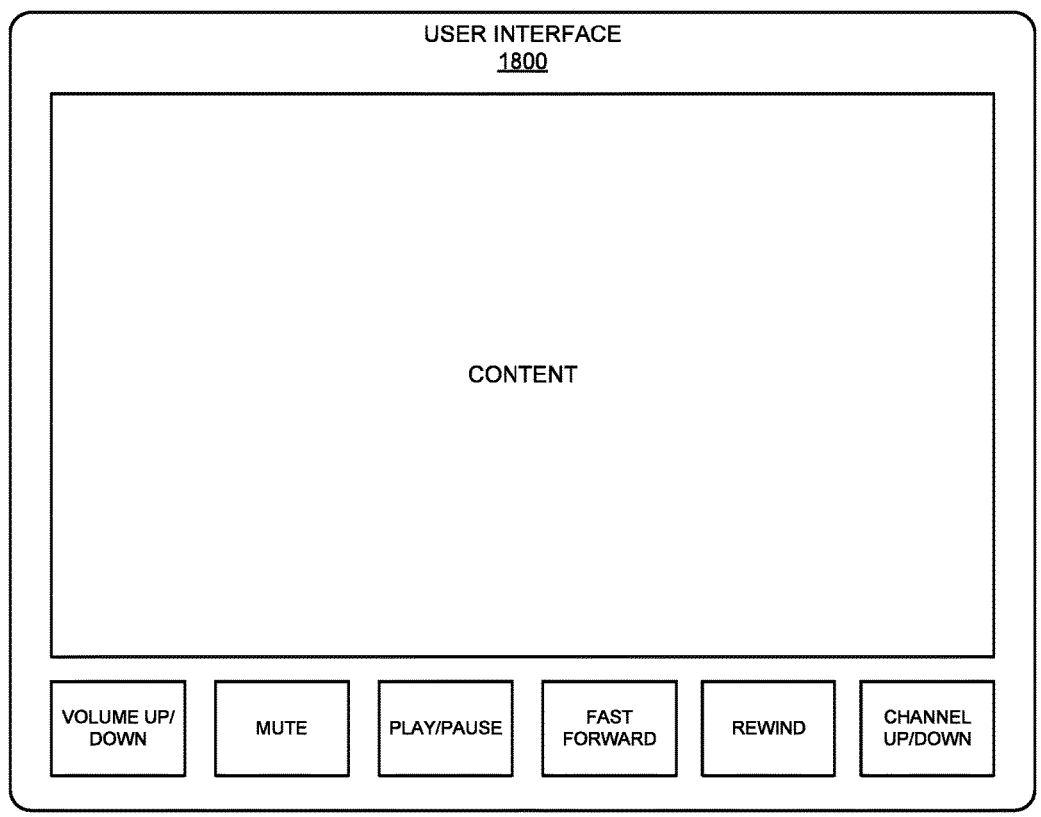
FIG. 18 is a drawing illustrating a user interface in accordance with an embodiment of the present disclosure.
Figure 19:
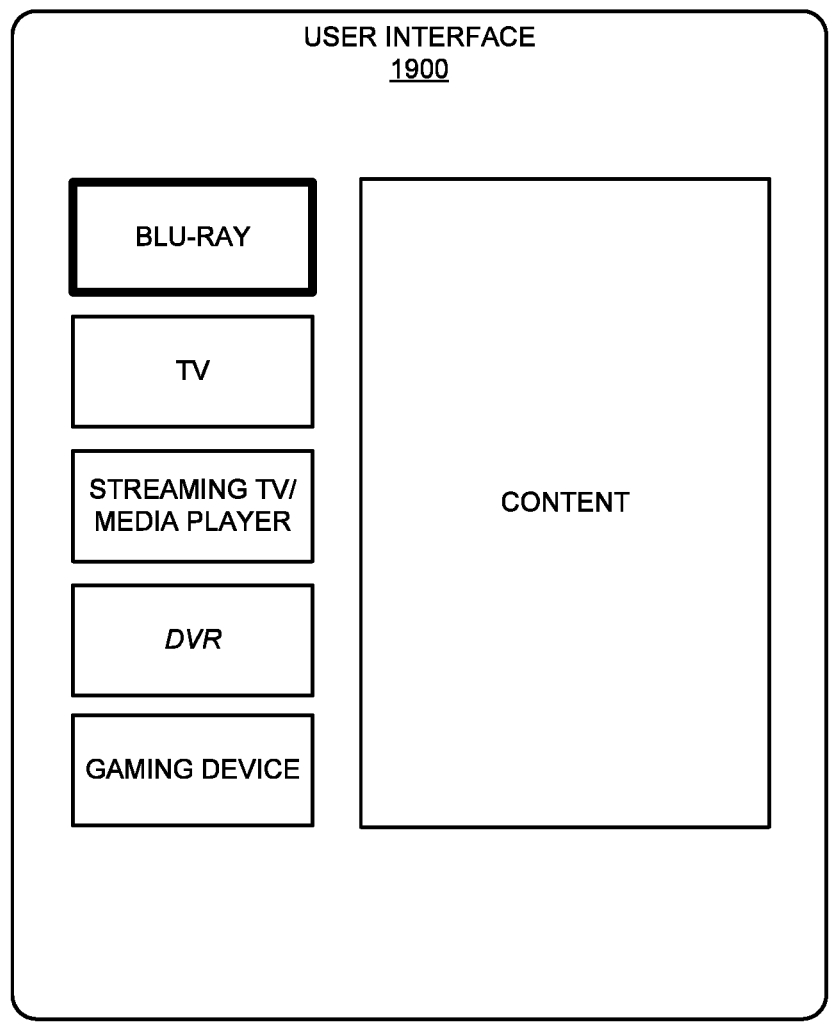
FIG. 19 is a drawing illustrating a user interface in accordance with an embodiment of the present disclosure.
Figure 20:
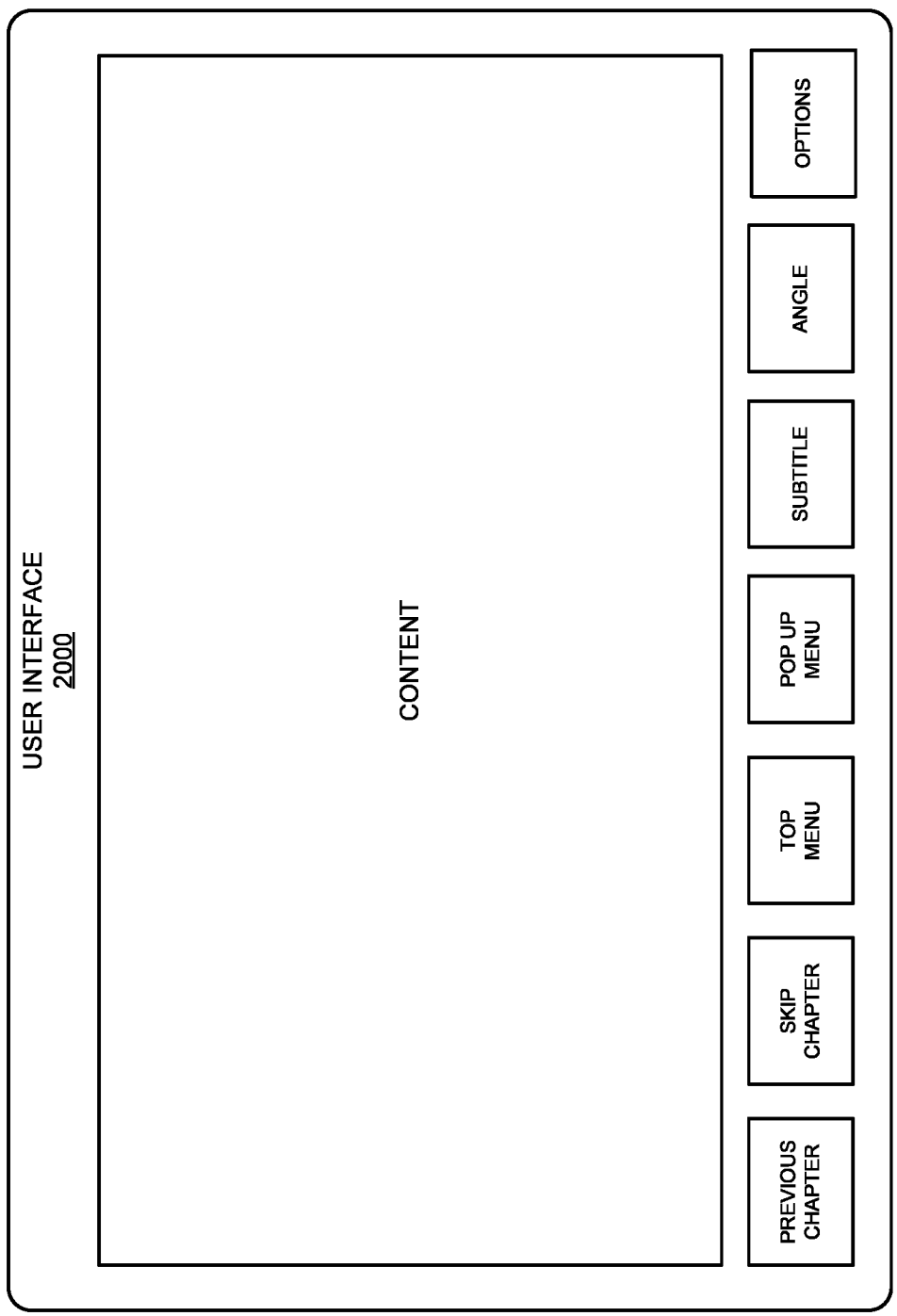
FIG. 20 is a drawing illustrating a user interface in accordance with an embodiment of the present disclosure.

FIG. 17-20 present drawings of user interfaces on a touch-sensitive display 124 in portable electronic device 110 in FIG. 1. In particular, FIG. 17 presents a user interface 1700 that can be used to select a particular entertainment device, such as a DVR. When the DVR is selected, the appropriate set of virtual command icons may be displayed based on the current state of the DVR. This is shown in FIG. 18, which presents user interface 1800. Similarly, when user interface 1900 in FIG. 19 is used to select a Blu-ray player, user interface 2000 in FIG. 20 with the appropriate set of virtual command icons may be displayed.

We now describe embodiments of an electronic device. FIG. 21 presents a block diagram illustrating an electronic device 2100, such as portable electronic device 110, A/V hub 112 or A/V display device 114 in FIG. 1. This electronic device includes processing subsystem 2110, memory subsystem 2112, networking subsystem 2114 and optional feedback subsystem 2134. Processing subsystem 2110 includes one or more devices configured to perform computational operations. For example, processing subsystem 2110 can include one or more microprocessors, application-specific integrated circuits (ASICs), microcontrollers, programmable-logic devices, and/or one or more digital signal processors (DSPs). One or more of these components in processing subsystem are sometimes referred to as a 'control circuit.'

Memory subsystem 2112 includes one or more devices for storing data and/or instructions for processing subsystem 2110 and networking subsystem 2114. For example, memory subsystem 2112 can include dynamic random access memory (DRAM), static random access memory (SRAM), and/or other types of memory. In some embodiments, instructions for processing subsystem 2110 in memory subsystem 2112 include: one or more program modules or sets of instructions (such as program module 2122 or operating system 2124), which may be executed by processing subsystem 2110. Note that the one or more program modules may constitute a computer-program mechanism, such as a computer program or software. Moreover, instructions in the various modules in memory subsystem 2112 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 2110.

In addition, memory subsystem 2112 can include mechanisms for controlling access to the memory. In some embodiments, memory subsystem 2112 includes a memory hierarchy that comprises one or more caches coupled to a memory in electronic device 2100. In some of these embodiments, one or more of the caches is located in processing subsystem 2110.

In some embodiments, memory subsystem 2112 is coupled to one or more high-capacity mass-storage devices (not shown). For example, memory subsystem 2112 can be coupled to a magnetic or optical drive, a solid-state drive, or another type of mass-storage device. In these embodiments, memory subsystem 2112 can be used by electronic device 2100 as fast-access storage for often-used data, while the mass-storage device is used to store less frequently used data.

Networking subsystem 2114 includes one or more devices configured to couple to and communicate on a wired and/or wireless network (i.e., to perform network operations), including: control logic 2116, interface circuits 2118 and associated antennas 2120. (While FIG. 21 includes antennas 2120, in some embodiments electronic device 2100 includes one or more nodes, such as nodes 2108, e.g., pads, which can be coupled to antennas 2120. Thus, electronic device 2100 may or may not include antennas 2120.) For example, networking subsystem 2114 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system. Note that the combination of a given one of interface circuits 2118 and at least one of antennas 2120 may constitute a radio. In some embodiments, networking subsystem 2114 includes a wired interface, such as HDMI interface 2130 (which may include a state-detection circuit).

Networking subsystem 2114 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 2100 may use the mechanisms in networking subsystem 2114 for performing simple wireless communication between the electronic devices, e.g., transmitting advertising or beacon frames and/or scanning for advertising frames transmitted by other electronic devices as described previously.

Within electronic device 2100, processing subsystem 2110, memory subsystem 2112, networking subsystem 2114 and optional feedback subsystem 2134 are coupled together using bus 2128. Bus 2128 may include an electrical, optical, and/or electro-optical connection that the subsystems can use to communicate commands and data among one another. Although only one bus 2128 is shown for clarity, different embodiments can include a different number or configuration of electrical, optical, and/or electro-optical connections among the subsystems.

In some embodiments, electronic device 2100 includes a display subsystem 2126 for displaying information on a display (such as the communication warning message), which may include a display driver, an I/O controller and the display. Note that a wide variety of display types may be used in display subsystem 2126, including: a two-dimensional display, a three-dimensional display (such as a holographic display or a volumetric display), a head-mounted display, a retinal-image projector, a heads-up display, a cathode ray tube, a liquid-crystal display, a projection display, an electroluminescent display, a display based on electronic paper, a thin-film transistor display, a high-performance addressing display, an organic light-emitting diode display, a surface-conduction electronic-emitter display, a laser display, a carbon-nanotube display, a quantum-dot display, an interferometric modulator display, a multi-touch touchscreen (which is sometimes referred to as a touch-sensitive display), and/or a display based on another type of display technology or physical phenomenon.

Furthermore, optional feedback subsystem 2134 may include one or more sensor-feedback mechanisms or devices, such as: a vibration mechanism or a vibration actuator (e.g., an eccentric-rotating-mass actuator or a linear-resonant actuator), a light, one or more speakers, etc., which can be used to provide feedback to a user of electronic device 2100 (such as sensory feedback about the status of a user instruction to change the state of one of the components in system 100 in FIG. 1).

Electronic device 2100 can be (or can be included in) any electronic device with at least one network interface. For example, electronic device 2100 can be (or can be included in): a desktop computer, a laptop computer, a subnotebook/netbook, a server, a tablet computer, a smartphone, a cellular telephone, a consumer-electronic device (such as a television, a set-top box, audio equipment, video equipment, etc.), a remote control, a portable computing device, an access point, a router, a switch, communication equipment, test equipment, and/or another electronic device.

Although specific components are used to describe electronic device 2100, in alternative embodiments, different components and/or subsystems may be present in electronic device 2100. For example, electronic device 2100 may include one or more additional processing subsystems, memory subsystems, networking subsystems, and/or display subsystems. Moreover, while one of antennas 2120 is shown coupled to a given one of interface circuits 2118, there may be multiple antennas coupled to the given one of interface circuits 2118. For example, an instance of a 3×3 radio may include three antennas. Additionally, one or more of the subsystems may not be present in electronic device 2100. Furthermore, in some embodiments, electronic device 2100 may include one or more additional subsystems that are not shown in FIG. 21. Also, although separate subsystems are shown in FIG. 21, in some embodiments, some or all of a given subsystem or component can be integrated into one or more of the other subsystems or component(s) in electronic device 2100. For example, in some embodiments program module 2122 is included in operating system 2124.

Moreover, the circuits and components in electronic device 2100 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 2114, such as one or more radios. Moreover, the integrated circuit may include hardware and/or software mechanisms that are used for transmitting wireless signals from electronic device 2100 and receiving signals at electronic device 2100 from other electronic devices. Aside from the mechanisms herein described, radios are generally known in the art and hence are not described in detail. In general, networking subsystem 2114 and/or the integrated circuit can include any number of radios.

In some embodiments, networking subsystem 2114 and/or the integrated circuit include a configuration mechanism (such as one or more hardware and/or software mechanisms) that configures the radios to transmit and/or receive on a given channel (e.g., a given carrier frequency). For example, in some embodiments, the configuration mechanism can be used to switch the radio from monitoring and/or transmitting on a given channel to monitoring and/or transmitting on a different channel. (Note that 'monitoring' as used herein comprises receiving signals from other electronic devices and possibly performing one or more processing operations on the received signals, e.g., determining if the received signal comprises an advertising frame, calculating a performance metric, performing spectral analysis, etc.) Furthermore, networking subsystem 2114 may include at least one port (such as an HDMI port 2132) to receive and/or provide the information in the data stream to A/V display device 114 (FIG. 1) and/or one of the one or more consumer-electronic devices 116 (FIG. 1).

While a communication protocol compatible with Wi-Fi was used as an illustrative example, the described embodiments may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the feedback technique may be implemented using program module 2122, operating system 2124 (such as drivers for interface circuits 2118) and/or in firmware in interface circuits 2118. Alternatively or additionally, at least some of the operations in the feedback technique may be implemented in a physical layer, such as hardware in interface circuits 2118.

Moreover, while the preceding embodiments included a touch-sensitive display in the portable electronic device that the user touches (e.g., with a finger or digit, or a stylus), in other embodiments the user interface is display on a display in the portable electronic device and the user interacts with the user interface without making contact or touching the surface of the display. For example, the user's interact(s) with the user interface may be determined using time-of-flight measurements, motion sensing (such as a Doppler measurement) or another non-contact measurement that allows the position, direction of motion and/or speed of the user's finger or digit (or a stylus) relative to position(s) of one or more virtual command icons to be determined. In these embodiments, note that the user may activate a given virtual command icon by performing a gesture (such as 'tapping' their finger in the air without making contact with the surface of the display). In some embodiments, the user navigates through the user interface and/or activates/deactivates functions of one of the components in system 100 (FIG. 1) using spoken commands or instructions (i.e., via voice recognition) and/or based on where they are looking in the visual feedback displayed on A/V display device 114 in FIG. 1 (e.g., by tracking the user's gaze or where the user is looking).

Furthermore, while A/V hub 112 (FIG. 1) was illustrated as a separate component from A/V display device 114 (FIG. 1), in some embodiments the components are combined into a single component or a single electronic device.

While the preceding embodiments illustrated the feedback technique with audio and video content, in other embodiments the feedback technique is used in the context of an arbitrary type of data or information. For example, the feedback technique may be used with home-automation data. In these embodiments, A/V hub 112 (FIG. 1) may facilitate communication among and control of a wide variety of electronic devices, including electronic devices in addition to or other than entertainment devices. Thus, A/V hub 112 (FIG. 1) and the feedback technique may be used to facilitate or implement the so-called Internet of things.

Moreover, while HDMI is used as an illustrative example of a content format in the preceding discussion, in other embodiments content that is compatible with another format or standard is used in the embodiments of the feedback technique.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A portable electronic device, comprising:
a touch-sensitive display;
one or more antennas;
an interface circuit communicatively coupled to the one or more antennas and configured to communicate with a separate electronic device; and
a control circuit, coupled to the touch-sensitive display and the interface circuit, configured to:
receive, via the interface circuit, measured device-state information, associated with the separate electronic device, that identifies a specific state of an entertainment device, wherein the measured device-state information corresponds to a measurement on signals conveyed on one or more signal lines associated with a connector between the separate electronic device and the entertainment device, wherein the one or more signal lines comprises a subset of the signal lines associated with the connector and the subset comprises a shield, wherein the measured device-state information corresponds to an intentional ground loop between the separate electronic device and the entertainment device, wherein the device state information corresponds to the specific state in a set of predefined states, which comprises two or more of: a power state, a playback state, a trick-mode state, a pause state, a standby state, or a state associated with receiving or providing content, and wherein the ground loop is modified by the specific state such that a particular signal corresponding to the ground loop is identifiable as pertaining to the specific state of the entertainment device;
generate, based on the measured device-state information corresponding to the particular signal corresponding to the ground loop, a user interface that includes multiple selectable features comprising virtual command icons associated with the specific state, wherein the user interface is customized to correspond to the specific state, an identified type of the entertainment device, and one or more related states of the entertainment device that are related to the specific state in a state diagram by corresponding operations that transition the entertainment device from the specific state to the one or more related states, and wherein the one or more related states are in the set of predefined states and are different from the specific state of the entertainment device; and
display the user interface on the touch-sensitive display.

2. The portable electronic device of claim 1, wherein the control circuit is configured to receive, via the interface circuit, one of: classification information for the entertainment device that specifies the type of the entertainment device; a manufacturer of the entertainment device; and context information that specifies a context of content associated with the entertainment device; and
wherein the virtual command icons are further based on one of: the type of the entertainment device, the manufacturer of the entertainment device, and the context.

3. The portable electronic device of claim 1, wherein the control circuit is configured to receive activation information specifying activation of a virtual command icon in the virtual command icons; and
wherein the activation of the virtual command icon specifies a transition of the entertainment device from the specific state to a new specific state in the state diagram.

4. The portable electronic device of claim 3, wherein activation of the virtual command icon involves the portable electronic device performing one of: detecting contact with the touch-sensitive display within a strike area of the virtual command icon and then breaking of the contact; and receiving information associated with a voice command.

5. The portable electronic device of claim 3, wherein the control circuit is configured to:
modify the user interface to change the virtual command icons based on the new specific state; and
display the modified user interface.

6. The portable electronic device of claim 1, wherein the user interface excludes one or more additional virtual command icons associated with one or more unrelated states of the entertainment device that are unrelated to the specific state by direct transitions in the state diagram.

7. The portable electronic device of claim 1, wherein a given operation directly transitions the entertainment device from the specific state to one of the additional states without passing through an intermediate state in the state diagram.

8. The portable electronic device of claim 1, wherein the specific state includes a power-off state of the entertainment device; and
wherein the one or more related states only includes a power-on state of the entertainment device.

9. The portable electronic device of claim 1, wherein the control circuit comprises:
memory configured to store a program module; and
a processor, coupled to the touch-sensitive display, the interface circuit and the memory, wherein, when executed by the processor, the program module causes the portable electronic device to perform the receiving, the generating and the displaying.

10. The portable electronic device of claim 1, wherein the generating and the displaying operations are dynamically performed as the specific state changes.

11. A non-transitory computer-readable storage medium for use in conjunction with a portable electronic device, the computer-readable storage medium storing a program module that, when executed by the portable electronic device, causes the portable electronic device to display a user interface by performing one or more operations comprising:
receiving, via an interface circuit in the portable electronic device, measured device-state information, associated with a separate electronic device, that identifies a specific state of an entertainment device, wherein the measured device-state information corresponds to a measurement on signals conveyed on one or more signal lines associated with a connector between the separate electronic device and the entertainment device, wherein the one or more signal lines comprises a subset of the signal lines associated with the connector and the subset comprises a shield, wherein the measured device-state information corresponds to an intentional ground loop between the separate electronic device and the entertainment device, wherein the device state information corresponds to the specific state in a set of predefined states, which comprises two or more of: a power state, a playback state, a trick-mode state, a pause state, a standby state, or a state associated with receiving or providing content, and wherein the ground loop is modified by the specific state such that a particular signal corresponding to the ground loop is identifiable as pertaining to the specific state of the entertainment device;
generating, based on the measured device-state information corresponding to the particular signal corresponding to the ground loop, a user interface that includes multiple selectable features comprising virtual command icons associated with the specific state, wherein the user interface is customized to correspond to the specific state, an identified type of the entertainment device, and one or more related states of the entertainment device that are related to the specific state in a state diagram by corresponding operations that transition the entertainment device from the specific state to the one or more related states, and wherein the one or more related states are in the set of predefined states and are different from the specific state of the entertainment device; and
displaying the user interface on a touch-sensitive display in the portable electronic device.

12. The computer-readable storage medium of claim 11, wherein the one or more operations comprise-receiving, via the interface circuit, one of: classification information for the entertainment device that specifies the type of the entertainment device; a manufacturer of the entertainment device; and context information that specifies a context of content associated with the entertainment device; and
wherein the virtual command icons are further based on one of: the type of the entertainment device, the manufacturer of the entertainment device, and the context.

13. The computer-readable storage medium of claim 11, wherein the one or more operations comprise receiving activation information specifying activation of a virtual command icon in the virtual command icons; and
wherein the activation of the virtual command icon specifies a transition of the entertainment device from the specific state to a new specific state in the state diagram.

14. The computer-readable storage medium of claim 13, wherein the activation of the virtual command icon involves the portable electronic device performing one of: detecting contact with the touch-sensitive display within a strike area of the virtual command icon and then breaking of the contact; and receiving information associated with a voice command.

15. The computer-readable storage medium of claim 13, wherein the one or more operations comprise:
modifying the user interface to change the virtual command icons based on the new specific state; and
displaying the modified user interface.

16. The computer-readable storage medium of claim 11, wherein the user interface excludes one or more additional virtual command icons associated with one or more unrelated states of the entertainment device that are unrelated to the specific state by direct transitions in the state diagram.

17. The computer-readable storage medium of claim 11, wherein a given operation directly transitions the entertainment device from the specific state to one of the additional states without passing through an intermediate state in the state diagram.

18. The computer-readable storage medium of claim 11, wherein the specific state includes a power-off state of the entertainment device; and
wherein the one or more related states only includes a power-on state of the entertainment device.

19. The computer-readable storage medium of claim 11, wherein the generating and the providing operations are dynamically performed as the specific state changes.

20. A method for displaying a user interface, wherein the method comprises:
by a portable electronic device:
receiving, via an interface circuit in the portable electronic device, measured device-state information, associated with a separate electronic device, that identifies a specific state of an entertainment device, wherein the measured device-state information corresponds to a measurement on signals conveyed on one or more signal lines associated with a connector between the separate electronic device and the entertainment device, wherein the one or more signal lines comprises a subset of the signal lines associated with the connector and the subset comprises a shield, wherein the measured device-state information corresponds to an intentional ground loop between the separate electronic device and the entertainment device, wherein the device state information corresponds to the specific state in a set of predefined states, which comprises two or more of: a power state, a playback state, a trick-mode state, a pause state, a standby state, or a state associated with receiving or providing content, and wherein the ground loop is modified by the specific state such that a particular signal corresponding to the ground loop is identifiable as pertaining to the specific state of the entertainment device;
generating, based on the measured device-state information corresponding to the particular signal corresponding to the ground loop, a user interface that includes multiple selectable features comprising virtual command icons associated with the specific state, wherein the user interface is customized to correspond to the specific state, an identified type of the entertainment device, and one or more related states of the entertainment device that are related to the specific state in a state diagram by corresponding operations that transition the entertainment device from the specific state to the one or more related states, and wherein the one or more related states are in the set of predefined states and are different from the specific state of the entertainment device; and displaying the user interface on a touch-sensitive display in the portable electronic device.

\* \* \* \* \*